(12) United States Patent
Dockery et al.

(10) Patent No.: US 9,631,122 B1
(45) Date of Patent: Apr. 25, 2017

(54) TUNGSTEN-PROCESSING SLURRY WITH CATIONIC SURFACTANT

(71) Applicant: Cabot Microelectronics Corporation, Aurora, IL (US)

(72) Inventors: Kevin Dockery, Aurora, IL (US); Helin Huang, Aurora, IL (US); Lin Fu, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 14/925,054

(22) Filed: Oct. 28, 2015

(51) Int. Cl.
*C09G 1/02* (2006.01)
*C23F 3/04* (2006.01)
*B24B 37/24* (2012.01)

(52) U.S. Cl.
CPC ............... *C09G 1/02* (2013.01); *B24B 37/24* (2013.01); *C23F 3/04* (2013.01)

(58) Field of Classification Search
None
See application file for complete search history.

(56) References Cited

U.S. PATENT DOCUMENTS

| | | | |
|---|---|---|---|
| 6,979,252 B1 | 12/2005 | Siddiqui et al. | |
| 8,778,803 B2 | 7/2014 | Narita | |
| 9,127,187 B1 * | 9/2015 | Grumbine | C09G 1/02 |
| 2004/0132305 A1 * | 7/2004 | Nishimoto | C09G 1/02 |
| | | | 438/690 |
| 2005/0031789 A1 * | 2/2005 | Liu | C09G 1/02 |
| | | | 427/340 |
| 2005/0208883 A1 * | 9/2005 | Yoshida | C09G 1/02 |
| | | | 451/41 |
| 2009/0074709 A1 * | 3/2009 | Koepsel | A01N 33/12 |
| | | | 424/78.32 |
| 2009/0081871 A1 * | 3/2009 | Dysard | C09G 1/02 |
| | | | 438/693 |
| 2009/0246957 A1 * | 10/2009 | Kamimura | C09G 1/02 |
| | | | 438/693 |
| 2010/0105595 A1 * | 4/2010 | Lee | C09G 1/02 |
| | | | 510/176 |
| 2011/0062376 A1 | 3/2011 | Reiss et al. | |
| 2014/0242798 A1 * | 8/2014 | Izawa | C09K 3/1445 |
| | | | 438/693 |
| 2014/0315386 A1 * | 10/2014 | Zhou | C09K 3/1445 |
| | | | 438/693 |
| 2015/0221521 A1 * | 8/2015 | Hou | H01L 21/3212 |
| | | | 438/693 |
| 2015/0259572 A1 * | 9/2015 | Grumbine | C09G 1/02 |
| | | | 438/693 |
| 2015/0259573 A1 * | 9/2015 | Grumbine | H01L 21/3212 |
| | | | 438/693 |
| 2015/0259574 A1 * | 9/2015 | Grumbine | C09G 1/02 |
| | | | 438/693 |
| 2015/0267081 A1 * | 9/2015 | Fu | C09G 1/02 |
| | | | 216/38 |
| 2015/0267083 A1 * | 9/2015 | Ward | C09G 1/02 |
| | | | 438/693 |
| 2015/0376461 A1 * | 12/2015 | Grumbine | B24B 1/00 |
| | | | 216/53 |
| 2015/0376462 A1 * | 12/2015 | Fu | C09G 1/02 |
| | | | 438/693 |
| 2015/0376463 A1 * | 12/2015 | Fu | C09G 1/02 |
| | | | 438/693 |
| 2016/0090513 A1 * | 3/2016 | Zhang | C09G 1/02 |
| | | | 216/53 |

* cited by examiner

*Primary Examiner* — Allan Olsen
(74) *Attorney, Agent, or Firm* — Thomas Omholt; Erika Wilson; Daniel C. Schulte

(57) ABSTRACT

Described are chemical mechanical polishing compositions and methods of using the compositions for planarizing a surface of a substrate that contains tungsten, the compositions containing silica abrasive particles and cationic surfactant.

23 Claims, No Drawings

TUNGSTEN-PROCESSING SLURRY WITH CATIONIC SURFACTANT

FIELD OF THE INVENTION

The invention relates to slurries useful in methods for chemical-mechanical polishing (or planarizing) a surface of a substrate that contains tungsten.

BACKGROUND

Methods, materials, and equipment useful in chemical-mechanical polishing (CMP) or planarizing of a substrate are highly varied and are available for processing a wide range of substrates having different surfaces and end applications. Substrates that are processed by CMP methods include optical products and semiconductor substrates at any of various stages of fabrication. A wide range of CMP apparatuses, slurries, polishing pads, and methods are well-known and more are being continually developed.

Polishing compositions (also known as polishing slurries, CMP slurries, and CMP compositions) are designed to process (e.g., polish, planarize) a surface of a semiconductor substrate. Some such surfaces contain a metal such as tungsten. A polishing slurry may contain chemical ingredients that are selected specifically for processing a certain type of substrate, such as for polishing a tungsten-containing surface as opposed to surfaces that do not contain a metal or that contain a metal different from tungsten. Examples of such chemical ingredients include chemical catalysts, inhibitors, chelating agents, surfactants, oxidants, among others; each of these may be selected to improve desired processing of a metal or non-metal component of a substrate surface. In addition, the polishing composition may contain abrasive particles suspended in an aqueous medium. The type of abrasive particles may also be selected based on the type of substrate being processed. Certain types of abrasive particles may be useful in polishing a tungsten-containing substrate surface but may not be useful for processing other CMP substrate surfaces.

Methods of polishing tungsten-containing substrates have become important for advanced nodes of semiconductor processing. In a conventional tungsten-polishing operation, a substrate (wafer) to be polished is mounted on a carrier (polishing head), which is in turn mounted on a carrier assembly and positioned in contact with a polishing pad in a CMP apparatus (polishing tool). The carrier assembly provides a controllable pressure to the substrate, pressing the substrate against the polishing pad. The substrate and pad are moved relative to one another by an external driving force. The relative motion of the substrate and pad abrades and removes material from the surface of the substrate, thereby polishing the substrate. Polishing and removal of material may be based on the combined effects of the chemical activity of the polishing composition (e.g., by catalyst, oxidizing agent, etc., present in the polishing slurry), and the mechanical activity of the abrasive particles suspended in the polishing composition.

Examples of steps of semiconductor processing that involve tungsten at a surface of a substrate include preparing tungsten "plug" and "interconnect" structures within a dielectric layer. By these methods, tungsten is deposited over a dielectric layer that includes openings, with the tungsten flowing into the openings to fill the openings. Excess tungsten will also be deposited over the dielectric layer and must be removed. The tungsten is removed by CMP polishing to leave behind the tungsten plugs and tungsten interconnects filled into the initial openings of the dielectric layer, as components of a planarized substrate surface.

As semiconductor device feature sizes continue to shrink, meeting local and global planarity requirements becomes more difficult in CMP operations (e.g., in tungsten polishing operations). Array erosion (also referred to as oxide erosion), plug and line recessing, and tungsten etching defects are known to compromise planarity and overall device integrity. For example, excessive array erosion may lead to difficulties in subsequent lithography steps as well as electrical contact problems that can degrade electrical performance. Tungsten etching, tungsten corrosion, and plug and line recessing may also degrade electrical performance or even cause device failure. The polishing process is desirably effective to remove an amount of tungsten without producing unacceptable erosion or other undesired topography effects at the substrate surface. Also desired are a low level of scratching and a low amount of residue left at the polished surface.

While maintaining or improving performance levels, the semiconductor industry is always subject to downward pricing pressure. High processing throughput is required to achieve desired economics. High throughput can be achieved with high removal rates of tungsten or other materials. Downward pricing pressure applies also to CMP consumables themselves, such as slurries, meaning that a lower cost slurry or a slurry that can be used with lower operational costs or cost of ownership will also be economically advantageous. Slurries that include less water (and, e.g., higher concentrations of abrasive particles) during storage, transportation, or use, can have a significant positive impact on cost of ownership.

In view of the above, there is ongoing need in the semiconductor processing industry for a CMP slurry useful for polishing a tungsten-containing substrate, that provides improvements in one or more of: planarity of a polished surface, reduced defects in a polished surface (e.g., reduced scratching and reduced residue), reduced particle size growth during processing (increased size of abrasive particles can correspond to high defectivity), high throughput (e.g., due to useful or high removal rates for tungsten, oxide (e.g., TEOS), or both), and reduced overall cost (such as by improved concentratability).

SUMMARY

The present inventors have discovered new and inventive slurries for polishing surfaces of tungsten-containing substrates by chemical mechanical polishing techniques, these slurries sometimes being referred to herein as "CMP compositions," "slurry compositions," "polishing compositions," "CMP slurries," and the like. The novel slurries contain liquid carrier (e.g., water), silica abrasive particles, and cationic surfactant.

Previous slurries for CMP processing methods have included various types of surfactants, including certain different non-ionic surfactants, anionic surfactants, and cationic surfactants. However, it has been found that many of these surfactants are incompatible with certain CMP slurries adapted to polish a tungsten surface. In particular, CMP slurries that include positively charged silica particles are often not compatible with many surfactants because the surfactant can destabilize the slurry, such as by inducing or allowing for particle growth in the slurry either before or during CMP processing. In other cases, a surfactant may be compatible with abrasive particles, but may cause deleterious effects on polishing performance, such as by significantly reducing film removal rates, thereby lowering throughput. According to certain methods and slurries described herein, new CMP compositions include a cationic surfactant. The slurries may exhibit improved or unexpected advantages, such as useful or improved defectivity performance in tungsten buffing CMP applications, slurry stability during storage, or slurry stability during use, preferably while also resulting in acceptable removal rates during processing (e.g., preferably while causing little or no negative impact on removal rates).

Polishing compositions described herein contain cationic surfactant and positively-charged colloidal silica abrasive particles. The positively-charged silica particles can include a positive charge at a surface of the particle, a positive charge at the interior of the particle, or both, and can preferably exhibit a positive charge of at least 6 millivolts as determined by zeta potential measurements. The polishing slurry can include particles that are non-agglomerated, that are agglomerated, or both, e.g., at least 30, 40, or 50 percent agglomerated particles made of, e.g., 2, 3, or 4 primary particles.

The cationic surfactant can be of any type that, in combination with positively-charged silica abrasive particles and other optional ingredients, will produce a polishing composition effective to polish a tungsten-containing surface of a substrate. The cationic surfactant may be effective to stabilize the polishing slurry during storage, transport, and use (e.g., as measured by particle size growth); to allow for desired removal rates of tungsten and other materials (e.g., TEOS) from a substrate surface during processing; and to optionally and preferably exhibit improved defectivity performance (e.g., reduced scratching, reduced residue, or both), as compared to otherwise comparable CMP compositions that do not contain the same type and amount of the cationic surfactant.

Cationic surfactant useful in a tungsten-polishing slurry in combination with positively-charged silica particles include those cationic surfactants that have Formula 1:

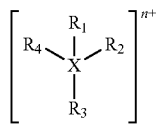

wherein
n is at least 1;
X is $P^+$ or $N^+$; and
each of $R_1$, $R_2$, $R_3$, and $R_4$ can be independently selected from:
  hydrogen,
  a saturated or unsaturated cyclic group which may be substituted or unsubstituted and which may optionally include a charged group,
  a linear or branched alkyl group which may be saturated or optionally include unsaturation, and which may include a saturated or unsaturated cyclic group, any of which may be substituted or include a charged group, and
  a saturated or unsaturated ring structure formed from two or three of $R_1$, $R_2$, $R_3$, and $R_4$, the ring optionally being substituted,
wherein the value of n and the Log P of the cationic catalyst meet the formula:

$$8(n-1)+\text{Log } P \geq 1$$

According to certain preferred cationic surfactant compounds of Formula 1, $R_1$, $R_2$, $R_3$, and $R_4$, are not all hydrogen. Preferably, at least one of $R_1$, $R_2$, $R_3$, and $R_4$, is non-hydrogen; e.g., at two, three, or four of $R_1$, $R_2$, $R_3$, $R_4$ can be non-hydrogen. In some embodiments, each of $R_1$, $R_2$, $R_3$, and $R_4$ can independently be a linear alkyl group having from 1 to 12 carbon atoms, e.g., from 2 to 8 carbon atoms and optionally containing one or more heteroatoms such as nitrogen atoms, e.g., charged or uncharged nitrogen atoms. Alternately or in addition, one or more of $R_1$, $R_2$, $R_3$, and $R_4$ can include a cyclic alkyl or aromatic ring, optionally substituted and optionally containing a heteroatom such as nitrogen, e.g., an un-substituted 6-member alkyl or aromatic ring, or an aromatic or saturated nitrogen-containing ring. Also optionally, one or more of $R_1$, $R_2$, $R_3$, and $R_4$ can include a charged group such as an alkylated cationic ammonium group.

The term "alkyl" as used herein refers to a branched or straight un-substituted hydrocarbon group including groups that are saturated or that include unsaturation. A "substituted" group (e.g., substituted alkyl, cycloalkyl, aryl) refers to a group in which a carbon-bonded hydrogen is replaced by a non-hydrogen atom such as a halide, or by a functional group such as an amine, hydroxide, etc.

Slurries as described are useful for processing (e.g., polishing or buffing) a tungsten-containing substrate surface, and include positively-charged silica abrasive particles, cationic surfactant, water, and optionally also may contain catalyst, stabilizer, inhibitor, or other optional minor ingredients. The cationic surfactant can be as described herein, selected to provide desired polishing performance such as one or more of: desirably low defectivity (e.g., reduced scratching) of processed substrates, acceptable removal rates for tungsten and other materials such as TEOS during processing, and useful or advantageously high slurry stability (e.g., in terms of particle size growth) during storage and use in CMP processing.

Preferred slurries can exhibit useful or advantageous stability in terms of low levels of particle size growth during transportation, storage, or use of the slurry. As is known, abrasive particles (independent of composition or slurry chemistry) of a CMP composition can, during storage, transportation, or use in a CMP process, form aggregates, agglomerates, or gels. Desirably, abrasive particles during use are substantially or mostly in the form of single (primary) abrasive particles optionally in combination with agglomerate particles made of a small number (e.g., 3 or 4) of primary particles. Substantially larger aggregates, agglomerates, and gels (also referred to as "oversized" particles), e.g., made up of 10 or more primary particles, are undesired. These "oversized" particles are detrimental to a CMP process and its substrate because the oversized particles are known to produce defects such as scratching, and to cause other problems such as filter plugging leading to instrument downtime or waste.

During CMP processing, abrasive particles of a slurry can tend to agglomerate to form oversized particles, which can result in increased defectivity such as increased scratches, increased residue after CMP polishing, or both. According to preferred methods and slurries as described, certain cationic surfactants included in a tungsten-polishing slurry that also contains cationically-charged silica abrasive particles can be effective to inhibit an increase in (average) particle size of abrasive particles during processing. During CMP processing using a slurry as described, containing cationically charged silica abrasive particles and cationic surfactant of Formula 1, particle size growth, particularly growth of particles to produce agglomerates of 10 or more primary particles, can be relatively less than particle size growth that would occur during identical CMP processing using a slurry that is otherwise identical but does not contain cationic surfactant of Formula 1. The reduction in particle size growth during processing avoids higher defectivity rates as measured by scratching, residue, or both.

Optionally and preferably a slurry as described, containing cationic surfactant and charged silica particles, can also include a lower water content (concentration) and higher abrasive particle content (concentration), with good stability, as compared to a slurry that is identical but does not contain cationic surfactant according to Formula 1, i.e., slurries containing cationic surfactant according to Formula 1 can exhibit higher concentratability of abrasive particles relative to otherwise identical slurries that do not contain cationic surfactant of Formula 1, without producing unduly high levels of agglomerated particles during transport or storage.

The term "concentratability" with respect to abrasive particles refers to the capacity of a CMP composition to contain a useful or high concentration of abrasive particles (e.g., charged colloidal silica particles as described) in suspension for an extended period of time during which the abrasive particles do not experience excessive particle size growth. It can be advantageous to prepare CMP compositions with relatively higher concentrations of abrasive particles, but a higher abrasive particle concentration can result in a less stable composition because higher concentrations of abrasive particles can tend to exhibit increased agglomeration and increased particle size growth. In commercial preparation, sale, and distribution of CMP compositions, a CMP composition is prepared and then typically placed in a sealed container such as a sealed and re-sealable container such as a drum or tote. The sealed container can be used to transport and store the CMP composition prior to use. During transportation and storage, the suspended abrasive particles are susceptible to settling and also to particle size growth; particle size grown occurs naturally over time when particles (primary particles or agglomerates) come into contact with and adhere to one another; higher concentrations of abrasive particles in a slurry can result in increased particle size growth. Such particle size growth, if excessive, can cause high levels of defects such as scratching upon use of the CMP composition and is, therefore, highly detrimental to the usefulness and value of the CMP composition.

According to the present invention, preferred embodiments of CMP compositions can include useful or advantageous concentratability, meaning that relatively high levels of abrasive particles (especially charged colloidal silica particles as described herein) can be suspended in the CMP compositions, and the composition can remain useful and stable over extended transportation and storage time (e.g., if contained in a sealed container) without experiencing undue particle size growth. For example, slurries that contain cationic surfactant of Formula 1 in combination with cationically-charged silica particles can contain a relatively higher concentration of the silica particles compared to otherwise comparable (e.g., identical) slurries that do not contain the cationic surfactant of Formula 1, while still not experiencing excessive particle size growth for a period of at least or in excess of 2 weeks, 4 weeks, or 2 or 3 months.

Excessive particle size growth is a level of particle size growth that would cause the slurry to be unusable in a commercial CMP process due its containing a level of large size ("oversized") agglomerated abrasive particles that would cause excessive scratching during use in CMP processing. Stated differently, a slurry as described, containing cationic surfactant of Formula 1 and at least 2.5, 3, 4, or 5 weight percent charged colloidal silica particles, with an average particle size of 60 nm, for example, can be stored at ambient conditions (e.g., 70 degrees Fahrenheit), without agitation, for a period of at least 2 weeks, 4 weeks, or 2 or 3 months after preparation, with the average particle size remaining below about 150 nm, preferably below about 100 or below about 90, 70, or 65 nanometers during the period; alternately measured, the slurry after such a storage period can contain less than 2, 1, 0.5, or 0.1 weight percent agglomerated particles (based on total weight abrasive particles in the slurry) made up of more than 10 primary particles or having a particle size greater than 0.5 μm (microns) (i.e., 500 nm).

In another embodiment, a slurry as described, containing cationic surfactant of Formula 1 and at least 2.5, 3, 4, or 5 weight percent charged colloidal silica particles, with an average particle size of 100 nm, for example, can be stored at ambient conditions (e.g., 70 degrees Fahrenheit), without agitation, for a period of at least 2 weeks, 4 weeks, or 2 or 3 months after preparation, with the average particle size remaining below about 300 nm, preferably below about 200 or below about 160, 140, or 130 nanometers during the period; alternately measured, the slurry after such a storage period can contain less than 2, 1, 0.5, or 0.1 weight percent agglomerated particles (based on total weight abrasive particles in the slurry) made up of more than 10 primary particles or having a particle size greater than 1 μm (microns) (i.e., 1000 nm).

Thus, according to embodiments of compositions of the invention, a container that holds a highly concentrated slurry can either: contain more abrasive particles per volume of the container, or be of a significantly reduced volume and weight to contain the same amount of abrasive particles. If the slurry can be shipped in a concentrated form and then used in a diluted form, shipping and storing the more highly concentrated slurry can reduce cost of use. For example, a slurry as described may be capable of being more highly concentrated (i.e., may contain a lower amount of water) before use in CMP (e.g., during storage and transport) as compared to an otherwise identical slurry that does not contain cationic surfactant of Formula 1, while still having good particle size stability. An advantage can occur, for example, if the more highly concentrated slurry is shipped and stored at a concentration of at least 3, greater than 3, at least 4, or at least 5 weight percent cationically-charged silica abrasive particles, and then diluted with water and used in a CMP process at a lower concentration of the abrasive particles, such as below 4, below 3, or at about a concentration of about 2.5 weight percent abrasive particles. Another slurry that is otherwise identical but does not contain cationic surfactant of Formula 1 might be shipped and stored at a 2.5 percent concentration of the abrasive particles (by weight) and then used at 2.5 percent concentration of the abrasive particles (by weight), where the removal rate and other performance of the inventive slurry are useful or comparable to the otherwise similar slurry.

Another important consideration in formulating slurries for polishing tungsten is that certain chemical materials, including certain nitrogen-containing compounds and cationic surfactants, can act as inhibitors to the removal of tungsten, oxide (e.g., TEOS), or both. Some nitrogen-containing compounds and cationic surfactants, if included in a tungsten-polishing slurry, can reduce the removal rates of tungsten, oxide (e.g., TEOS), or both. Accordingly, preferred slurries as described, which are useful for polishing a tungsten-containing surface and which include cationic surfactant and cationically-charged silica particles, can preferably perform as described herein, e.g., including with reduced particle size growth during storage or processing, without also resulting in an excessive reduction in a removal rate of tungsten, oxide (e.g., TEOS), or both.

In one aspect, the invention relates to a chemical mechanical planarization slurry useful for processing a tungsten-containing surface. The slurry includes: liquid carrier, silica abrasive particles dispersed in the liquid carrier, the particles having a positive charge of at least 8 millivolts (mV) in the slurry at a pH of from 1 to 6, and cationic surfactant. The cationic surfactant is a compound of Formula 1:

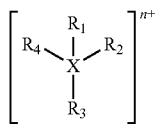

wherein
n is at least 1;
X is $P^+$ or $N^+$; and
each of $R_1$, $R_2$, $R_3$, and $R_4$ can be independently selected from:
hydrogen,
a saturated or unsaturated cyclic group which may be substituted or unsubstituted and which may optionally include a charged group,
a linear or branched alkyl group that may be saturated or optionally include unsaturation, and that may include a saturated or unsaturated cyclic group, any of which may be substituted or include a charged group, and
a saturated or unsaturated ring structure formed from two or three of $R_1$, $R_2$, $R_3$, and $R_4$, the ring optionally being substituted, and
wherein the value of n and the Log P of the cationic catalyst meet the formula:

$8(n-1)+\text{Log } P \geq 1$ or a salt thereof.

In another aspect, the invention relates to a method of chemical mechanical polishing a substrate that includes a surface comprising tungsten. The method includes: contacting the substrate with slurry as described herein, including a silica particles and cationic surfactant of Formula 1; moving the slurry relative to the substrate; and abrading the substrate to remove a portion of the tungsten from the substrate.

DETAILED DESCRIPTION

Described as follows are chemical mechanical planarization slurries, aka "polishing slurries," "chemical mechanical polishing slurries," "polishing compositions," "CMP compositions," and the like, that are useful for removing material from a tungsten-containing surface of a substrate. The polishing composition includes liquid carrier, colloidal silica abrasive particles dispersed in the liquid carrier, and cationic surfactant, such that the zeta potential of the slurry is positive. Preferably, the colloidal silica is positively-charged colloidal silica. Optionally, the polishing composition may also contain other additives or minor ingredients such as catalyst, oxidant, inhibitor, a pH-adjuster, among others.

As used herein, the term "colloidal silica particles" refers to silica particles prepared using a wet process, such as precipitated or condensation-polymerized silica. In contrast, a pyrogenic or flame hydrolysis process which produces structurally different particles, such as fumed silica, is not encompassed by this invention. The charged colloidal silica abrasive particles are dispersed or suspended throughout the liquid carrier, meaning that the polishing composition may also be referred to as a "dispersion." Various types of colloidal silica particles (e.g., charged, agglomerated, non-charged, non-agglomerated) are well known and available commercially.

When present in the polishing composition, the colloidal silica abrasive particles exhibit a positive charge. Also when present in the polishing composition, the charged colloidal silica abrasive particles can optionally and preferably include particles that are agglomerated and particles that are non-agglomerated. Non-agglomerated particles are individual particles that may be spherical or nearly spherical in shape, but can have other shapes as well such as generally elliptical, square, or rectangular cross-sections. The non-aggregated particles are referred to as primary particles. Aggregated particles are particles in which multiple discrete primary particles, not too many in number (e.g., 2, 3, 4, or 5 primary particles), have become clustered or bonded together to form a single particle from the multiple particles, the single particle having a generally irregular shape.

Various embodiments of positively-charged and optionally agglomerated colloidal silica particles are described in Applicant's copending U.S. patent application Ser. No. 14/222,086 filed on Mar. 21, 2014, Ser. No. 14/222,736 filed on Mar. 24, 2014, and Ser. No. 14/750,204 filed on Jun. 24, 2015, and in U.S. granted U.S. Pat. No. 9,127,187. Charged colloidal silica abrasive particles described in those patent applications may be useful in a polishing composition as presently described, and may be agglomerated or non-agglomerated. A polishing composition as described, prior to being used in a CMP process, may include aggregated colloidal silica particles, non-aggregated colloidal silica particles, or both. Aggregated particles may be present at a level that is useful or advantageous but not excessive, i.e., at a level that does not result in a high level of defects during processing. In certain embodiments, the positively-charged colloidal silica particles of the polishing compositions (prior to use) may be at least partially aggregated. For example, at least 30, 40, or 50 percent of the dispersed colloidal silica particles in the polishing composition can include three or more aggregated primary particles, e.g., three, four, or five aggregated primary particles, the remainder or substantial remainder of the particles being present in the form of primary particles. The agglomerated particles are not of a size and concentration that are sufficiently high to cause a high level of defects. For example, the agglomerated particles can mostly be agglomerated particles that contain not more than 10 primary particles; alternately stated, most of the agglomerated particles are preferably smaller than 0.5 μm (microns) (i.e., 500 nm).

The particle size of an abrasive particle is the diameter of the smallest sphere that encompasses the particle. Particles in a partially aggregated dispersion may have any suitable particle size, e.g., an average particle size (aggregate size) in a range from about 5 to about 150 nm. The abrasive particles may have an average particle size (aggregate size) of about 20 nm or more (e.g., about 25 nm or more, about 30 nm or more, about 40 nm or more, or about 45 nm or more). The abrasive particles may have an average particle size (aggregate size) of about 100 nm or less (e.g., about 90 nm or less, about 80 nm or less, about 70 nm or less, or about 65 nm or less). Accordingly, the abrasive particles may have an average particle size (aggregate size) in a range from about 20 nm to about 90 nm (e.g., from about 25 nm to about 90 nm, or from about 30 nm to about 90 nm). Preferably, abrasive particles of a dispersion can have an average particle size in a range from about 40 to about 70 nm or in a range from about 45 to about 65 nm. Particle size of colloidal silica particles may be measured using a dynamic light scattering tool such as the Zetasizer® available from Malvern Instruments® (Worcestershire, UK).

The polishing composition may include any suitable amount of colloidal silica particles. The polishing composition typically includes at least about 0.01 weight percent or more colloidal silica (e.g., about 0.05 weight percent or more). More typically, the polishing composition may include about 0.1 weight percent or more (e.g., about 1 weight percent or more, about 5 weight percent or more, about 7 weight percent or more, about 10 weight percent or more, or about 12 weight percent or more) colloidal silica particles. The amount of colloidal silica particles in the polishing composition may be about 30 weight percent or less, and more typically about 20 weight percent or less (e.g., about 15 weight percent or less, about 10 weight percent or less, about 5 weight percent or less, about 3 weight percent or less, or about 2 weight percent or less). Preferably, the amount of colloidal silica particles in the polishing composition is in a range from about 0.01 weight percent to about 20 weight percent, and more preferably from about 0.05 weight percent to about 15 weight percent (e.g., from about 0.1 weight percent to about 10 weight percent, from about 0.1 weight percent to about 4 weight percent, from about 0.1 weight percent to about 3 weight percent, from about 0.1 weight percent to about 2 weight percent, or from about 0.2 weight percent to about 2 weight percent).

The colloidal silica particles in the polishing composition have a positive charge. The charge is commonly referred to as the zeta potential (or the electrokinetic potential). The zeta potential of a particle refers to the electrical potential difference between the electrical charge of the ions surrounding the particle and the electrical charge of the bulk liquid of the slurry (e.g., the liquid carrier and any other components dissolved therein). The zeta potential is typically dependent on the pH of the slurry. For a given slurry, the isoelectric point of the particles is defined as the pH at which the zeta potential is zero. As the pH is increased or decreased away from the isoelectric point, the surface charge (and hence the zeta potential) is correspondingly decreased or increased (to negative or positive zeta potential values). The zeta potential of a dispersion such as a polishing composition may be obtained using the Model DT-1202 Acoustic and Electro-acoustic spectrometer available from Dispersion Technologies, Inc (Bedford Hills, N.Y.).

Preferred colloidal silica particles in the polishing composition have a positive charge of about 6 mV or more (e.g., about 8 or 10 mV or more, about 15 mV or more, about 20 mV or more, about 25 mV or more, or about 30 mV or more). The colloidal silica particles in the polishing composition may have a positive charge of about 50 mV or less (e.g., about 45 mV or less, about 40 mV or less, or about 35 mV or less). Preferably, the colloidal silica particles have a positive charge in a range from about 6 mV to about 50 mV (e.g., about 10 mV to about 45 mV, about 15 mV to about 40 mV, or about 20 mV to about 40 mV).

Preferably the charge is permanent, meaning that the positive charge on the silica particles is not readily reversible, for example, by flushing, dilution, filtration, or the like. A permanent positive charge may be the result, for example, of incorporating a cationic compound onto or within the interior portion of the particle, below an outer surface of the particle. The cationic compound may include, for example, a metal cation, a nitrogen-containing compound such as an amine, a phosphonium compound, or a combination of two or more of these. A permanent positive charge may result, for example, from a covalent interaction between the particle and the cationic compound and is in contrast to a reversible positive charge that may be the result, for example, of an electrostatic interaction between the particle and the cationic compound. It will be understood that the present disclosure is not limited to any particular means of obtaining a permanent positive charge.

Notwithstanding, as used herein, a permanent positive charge of at least 6 mV (e.g., 8 mV, or higher) means that the zeta potential of the colloidal silica particles remains above 6 mV (or higher) after the following a three step filtration test as follows. A volume of the polishing composition (e.g., 200 ml) is filtered through a Millipore Ultracell regenerated cellulose ultrafiltration disk (e.g., having a MW cutoff of 100,000 Daltons and a pore size of 6.3 nm). The remaining dispersion (the approximately 65 ml of dispersion that is retained by the ultrafiltration disk) is collected and replenished with pH adjusted deionized water. The deionized water is pH adjusted to the original pH of the polishing composition using a suitable inorganic acid such as nitric acid. This procedure is repeated for a total of three filtration cycles. The zeta-potential of the triply filtered and replenished dispersion is then measured and may be compared with the zeta potential of the original polishing composition.

While wishing to not be bound by theory, it is believed that the dispersion retained by the ultrafiltration disk (the retained dispersion) includes the silica particles and any chemical components (e.g., the positively-charged species) that may be in the particles or associated with the surface of the particles (e.g., bonded, attached, electrostatically interacting, or in contact with the particle surface). At least a portion of the liquid carrier and the chemical components dissolved therein pass through the ultrafiltration disk. Replenishing the retained dispersion to the original volume is believed to upset the equilibrium in the original polishing composition such that the chemical components associated with the particle surface may tend toward a new equilibrium. Components that are internal to the particle or are strongly associated (e.g., covalently bonded) with the particle surface remain with the particle such that there tends to be little if any change in the positive zeta potential thereof. In contrast, a portion of components that have a weaker association (e.g., an electrostatic interaction) with the particle surface may return to the solution as the system tends toward the new equilibrium, thereby resulting in a reduction in the positive zeta potential. Repeating this process for a total of three ultrafiltration and replenishing cycles is believed to amplify the above-described effect.

It is preferred that there is little difference between the zeta potential of the colloidal silica particles in the original polishing composition and the colloidal silica particles in the polishing composition after the above-described three step filtration test (after correcting for ionic strength differences resulting from the filtration test). For example, it is preferred that the zeta potential of the colloidal silica particles in the original polishing composition is less than about 10 mV greater than the zeta potential of the colloidal silica particles after the three step filtration test (e.g., less than about 7 mV greater, less than about 5 mV greater, or even less than about 2 mV greater). Stated another way it is preferred that the zeta potential of the colloidal silica particles after the three-step filtration test is less than 10 mV (or less than 7 mV, or less than 5 mV, or less than 2 mV less) less than the zeta potential of the colloidal silica particles in the original polishing composition. For example, in an embodiment in which the zeta potential of the colloidal silica particles in the original polishing composition is 30 mV, the zeta potential of the colloidal silica particles after the three-step filtration test is preferably greater than 20 mV (or greater than 23 mV, or greater than 25 mV, or greater than 28 mV).

Colloidal silica particles can be prepared by various methods, some examples of which are commercially used and known. Useful colloidal silica particles include precipitated or condensation-polymerized silica, which may be prepared using known methods, such as by methods referred to as the "sol gel" method or by silicate ion-exchange. Condensation-polymerized silica particles are often prepared by condensing $Si(OH)_4$ to form substantially spherical particles. The precursor $Si(OH)_4$ may be obtained, for example, by hydrolysis of high purity alkoxysilanes, or by acidification of aqueous silicate solutions. U.S. Pat. No. 5,230,833 describes a method for preparing colloidal silica particles in solution.

A partially aggregated dispersion in which 30 percent or more of colloidal silica particles in the dispersion include three or more aggregated primary particles may be prepared using a multi-step process in which primary particles are first grown in solution, for example as described in the '833 patent. The pH of the solution may then be adjusted to an acidic value for a predetermined time period to promote aggregation (or partial aggregation). An optional final step may allow for further growth of the aggregates (and any remaining primary particles). See Applicant's copending U.S. patent application Ser. No. 14/222,086, filed Mar. 21, 2014.

To provide colloidal silica particles that exhibit a positive charge, the particles may be prepared in a manner that includes placing at the particle surface, or at the particle interior, a chemical compound that is capable of exhibiting a positive charge, i.e., a cationic compound. For example, silica particles that exhibit a positive charge can be produced by placing a cationic compound at an external surface of the particles. CMP compositions that include this type of surface-charged colloidal silica abrasive particles are described, for example, in U.S. Pat. Nos. 7,994,057 and 8,252,687.

In alternate embodiments, cationic compound can be incorporated into the interior of colloidal silica abrasive particles, below an outer surface. The cationic compound may be, for example, a nitrogen-containing compound or a phosphorous-containing compound, e.g., an aminosilane or a phosphonium silane compound. Examples of such interior-charged particles are described in Applicant's copending U.S. patent application Ser. No. 14/750,204, filed Jun. 25, 2015.

When the cationic compound is a nitrogen-containing compound it preferably includes an amine compound or an ammonium compound. When the cationic compound is a phosphorus-containing compound it preferably includes a phosphine compound or phosphonium compound. An ammonium compound may include $R^1R^2R^3R^4N^+$ and a phosphonium compound may include $R^1R^2R^3R^4P^+$, wherein each $R^1$, $R^2$, $R^3$, and $R^4$ independently represents hydrogen, $C_1$-$C_6$ alkyl, a $C_7$-$C_{12}$ arylalkyl, or a $C_6$-$C_{10}$ aryl. These groups can be further substituted with one or more hydroxyl groups.

Example ammonium compounds may include tetrabutylammonium, tetrapentylammonium, and benzyltrimethylammonium. In certain embodiments, the ammonium compound is preferably not ammonia or ammonium ($NH_3$ or $NH_4^+$).

Example phosphonium compounds may include tetramethylphosphonium, tetraethylphosphonium, tetrapropylphosphonium, tetrabutylphosphonium, tetraphenylphosphonium, methyltriphenylphosphonium, ethyltriphenylphosphonium, butyltriphenylphosphonium, benzyltriphenylphosphonium, dimethyldiphenylphosphonium, hydroxymethyltriphenylphosphonium, and hydroxyethyltriphenylphosphonium. Example phosphonium compounds may also include a phosphonium silane compound.

A nitrogen-containing cationic compound may also include a substance having an amino group such as a primary amine, a secondary amine, a tertiary amine, or a quaternary amine compound. Such a nitrogen-containing cationic compounds may include an amino acid, for example, an amino acid having from one to eight carbon atoms such as lysine, glutamine, glycine, iminodiacetic acid, alanine, valine, leucine, isoleucine, serine, and threonine.

Alternately the cationic compound may be an aminosilane compound. Such aminosilane compounds may include primary aminosilanes, secondary aminosilanes, tertiary aminosilanes, quaternary aminosilanes, and multi-podal (e.g., dipodal) aminosilanes. The aminosilane compound may include substantially any suitable aminosilane, for example, a propyl group containing aminosilane, or an aminosilane compound including a propyl amine. Examples of suitable aminosilanes may include bis(2-hydroxyethyl)-3-aminopropyl trialkoxysilane, diethylaminomethyltrialkoxysilane, (N,N-diethyl-3-aminopropyl)trialkoxysilane), 3-(N-styrylmethyl-2-aminoethylaminopropyl trialkoxysilane, aminopropyl trialkoxysilane, (2-N-benzylaminoethyl)-3-aminopropyl trialkoxysilane), trialkoxysilyl propyl-N,N,N-trimethyl ammonium chloride, N-(trialkoxysilylethyl)benzyl-N,N,N-trimethyl ammonium chloride, (bis(methyldialkoxysilylpropyl)-N-methyl amine, bis(trialkoxysilylpropyl)urea, bis(3-(trialkoxysilyl)propyl)-ethylenediamine, bis(trialkoxysilylpropyl)amine, bis(trialkoxysilylpropyl)amine, 3-aminopropyltrialkoxysilane, N-(2-Aminoethyl)-3-aminopropylmethyldialkoxysilane, N-(2-Aminoethyl)-3-aminopropyltrialkoxysilane, 3-Aminopropylmethyldialkoxysilane, 3-Aminopropyltrialkoxysilane, (N-Trialkoxysilylpropyl)polyethyleneimine, Trialkoxysilylpropyldiethylenetriamine, N-Phenyl-3-aminopropyltrialkoysilane, N-(Vinylbenzyl)-2-aminoethyl-3-aminopropyltrialkoxysilane hydrochloride, 4-Aminobutyltrialkoxysilane, and mixtures thereof. Those of ordinary skill in the art will readily appreciate that aminosilane compounds are commonly hydrolyzed (or partially hydrolyzed) in an aqueous medium. Thus by reciting an aminosilane compound, it will be understood that the aminosilane and/or a hydrolyzed (or partially hydrolyzed) species and/or condensed species thereof may be incorporated in the colloidal silica abrasive particles.

It will be understood that the colloidal silica abrasive particles may include two or more of the above-described cationic compounds that may be: incorporated into the interiors of the particles, located at surfaces of the particles, or both. For example, in one embodiment of positively-charged colloidal silica particles, a first incorporated cationic compound may include an aminosilane compound and a second incorporated cationic compound may include an ammonium compound, such as a quaternary amine. In an embodiment in which the first cationic compound is an aminosilane compound and the second cationic compound is a quaternary amine, a molar ratio of the first cationic compound to the second cationic compound is preferably less than about 5 to 1.

By certain methods described in Applicant's copending patent application 14/750,204, filed Jun. 25, 2015, positively-charged colloidal silica abrasive particles may be prepared by steps that incorporate a cationic compound into the abrasive particles (i.e., the cationic compound becomes located below the surface of the particles at the interior of the particles). Colloidal silica abrasive particles having an internal cationic compound that provides a positive charge may be fabricated, for example, by growing the abrasive particles in a liquid solution containing the cationic compound such that the cationic compound becomes incorporated into at least a portion of the colloidal silica particles during growth thereof. Alternate embodiments of internal-charged colloidal silica particles may be prepared by treating a conventional colloidal silica particle with the cationic compound and then growing additional silica over the cationic compound to thereby cover the cationic compound with additional silica. While the cationic compound is incorporated internally in the colloidal silica abrasive particles, it will be understood that an amount of the cationic compound may also be at or near the particle surface such that the cationic compound is both internal to the surface and at the surface.

By one such embodiment, colloidal silica abrasive particles having an internal cationic compound may be prepared, for example, by (i) providing a liquid solution (e.g., including water at a predetermined pH) and (ii) combining the liquid solution with silica-producing compound and the cationic compound and causing colloidal silica particles to grow in the liquid solution such that a dispersion is obtained including colloidal silica particles having the cationic compound incorporated therein. The cationic compound may alternately be included in the liquid solution provided in (i). The silica-producing compound may include, for example, tetramethyl orthosilicate (TMOS), tetraethyl orthosilicate (TEOS), silicic acid, an alkali or ammonium silicate, or a silicon tetrahalide. This method is similar to that disclosed in U.S. Pat. No. 8,529,787 in which TMOS is continuously added to a mother liquid including an alkali catalyst (the similarity is that a silica producing compound is combined with a liquid solution to produce colloidal silica particles).

The cationic compound may be added to the liquid solution in substantially any suitable amount sufficient to incorporate the cationic compound into the colloidal silica particles (with the particles preferably—although not necessarily—including less than 10 weight percent of the cationic compound incorporated therein). The aqueous liquid solution may further optionally include an alkali catalyst, for example, including an ether amine, an ethylene amine, a tetraalkyl amine, an alcohol amine, or two or more of these. Suitable alkali catalysts may include an organic base catalyst such as ethylenediamine, diethylenetriamine, triethylenetetramine, ammonia, urea, monoethanolamine, diethanolamine, triethanolamine, tetramethylammonium hydroxide (TMAH), tetramethylguanidine, tetraethylammonium hydroxide, aminopropylmorpholine, hexyloxypropylamine, ethyloxypropylamine (EOPA), jeffamine HK-511, or combinations thereof. The alkali catalyst may alternatively or additionally include potassium hydroxide (KOH). The amount of alkali catalyst added may be selected so that the pH of the aqueous liquid solution is generally in the range from about 7 to about 14 and preferably in the range from about 9 to about 12.

The liquid solution may optionally further include colloidal silica particles that are intended to act as nucleation sites for growth of the colloidal silica. In such embodiments, the final colloidal silica may be thought of as having a core-shell structure (or a multi-layer structure) in which the core includes the colloidal silica particles originally added to the liquid solution, and the shell (the outer layer) includes the silica that is grown over the core and includes an internal cationic compound (such as an aminosilane).

In a second embodiment, positively-charged colloidal silica abrasive particles having an internal cationic compound may be prepared by (i) providing a high pH silicate solution (e.g., a sodium silicate or potassium silicate solution), (ii) processing the silicate solution to protonate the silicate anions and form silicic acid (e.g., by adding an acid to the solution or passing the solution through an ion exchange column) which in turn causes precipitation and growth of colloidal silica particles in a reaction vessel, and (iii) adding the cationic compound to the reaction vessel such that it becomes incorporated into the growing colloidal silica particles. The silicate solution preferably has a pH in the range from about 11 to about 13. The silicate solution may be passed through an ion exchange column into the reaction vessel, which tends to lower the pH to a value in a range from about 2 to about 5. The cationic compound may be added to the reaction vessel in substantially any suitable amount and at substantially any suitable rate such that a sufficient amount of the cationic compound is incorporated into the colloidal silica particles (with the particles preferably—although not necessarily—including less than 10 weight percent of the cationic compound incorporated therein).

In a third embodiment, positively-charged colloidal silica abrasive particles may be prepared by treating (e.g., surface treating) conventional (e.g., uncharged) colloidal silica particles with cationic compound, and then growing additional silica over the treated colloidal silica (i.e., over the cationic compound). For example, a nitrogen-containing compound such as a quaternary amine compound or an aminosilane compound may be added to a colloidal silica-containing dispersion (e.g., as taught in U.S. Pat. Nos. 7,994,057 and 8,252,687). After sufficient time to allow the nitrogen compound to become associated (e.g., chemically bonded or electrostatically associated) with the colloidal silica particles, a silica producing compound such as TMOS, TEOS, silicic acid, an alkali or ammonium silicate, or a silica tetrahalide may be added to the dispersion. The dispersion may be optionally heated (e.g., to 45 degrees C.) to accelerate further growth of the colloidal silica particles such that the cationic (e.g., nitrogen-containing) compound (the surface treatment agent) becomes incorporated into the particles at the particle interiors. Such positively-charged colloidal silica particles may be thought of as having at a core and multiple layers or coatings over the core: a first inner layer of the cationic compound on the core (i.e., the cationic compound-treated colloidal silica core), and an outer layer of silica deposited over the cationic compound, thereby placing the cationic compound at an interior location of the particle.

It will be understood that the above-described methods for preparing positively-charged colloidal silica particles having an internal cationic compound produce a dispersion in which the colloidal silica particles are suspended in a liquid carrier. In preparing the chemical mechanical polishing compositions herein, this dispersion may be diluted to a predetermined concentration of colloidal silica particles. Moreover, other chemical compounds may be added to the dispersion (before or after dilution) as desired.

The interior-charged colloidal silica particles of a dispersion or a polishing compound may have any suitable degree of aggregation prior to or at the start of processing, but amount of aggregation and size of aggregated particles should not result in a high level of defects during CMP processing. The positively-charged colloidal silica particles may be substantially non-aggregated, including mostly primary particles. Alternately, the particles may be partially aggregated. By partially aggregated it may be that 50 percent or more of the colloidal silica abrasive particles include two or more aggregated primary particles (e.g., three, four, or five aggregated particles) or that 30 percent or more (or 45 percent or more) of the colloidal silica particles include three or more (e.g., four or five) aggregated primary particles. Such partially aggregated colloidal silica abrasives may be prepared, for example, using a multi-step process in which primary particles are first grown in solution, for example as described in U.S. Pat. No. 5,230,833. The pH of the solution may then be adjusted to an acidic value for a predetermined time period to promote aggregation (or partial aggregation), for example, as described in U.S. Pat. No. 8,529,787. An optional final step may allow for further growth of the aggregates (and any remaining primary particles).

The positively-charged colloidal silica abrasive particles may further have an aggregate distribution in which 20 percent or more of the colloidal silica abrasive particles include fewer than three primary particles (i.e., non-aggregated primary particles or aggregated particles having just two primary particles, also referred to as monomers and dimers) and 50 percent or more of the colloidal silica abrasive particles include three or more aggregated primary particles.

The polishing composition includes a liquid carrier that facilitates application of the abrasive particles and other chemical ingredients and additives of the polishing composition to a surface of a substrate to be polished (e.g., planarized). The liquid carrier may be any suitable carrier (e.g., solvent) such as a lower alcohol (e.g., methanol, ethanol, etc.), ethers (e.g., dioxane, tetrahydrofuran, etc.), water, or a mixture thereof. Preferably, the liquid carrier comprises, consists essentially of, or consists of water, more preferably deionized water. A carrier that consists essentially of water can contain up to (not more than) 3, 2, 1, 0.5, 0.1, or 0.05 weight percent non-water solvent such as a lower alcohol (e.g., methanol, ethanol, etc.), ethers (e.g., dioxane, tetrahydrofuran, etc.).

The polishing composition is acidic, having a pH of less than about 7. The polishing composition typically has a pH of about 1 or more (e.g., about 2 or more, or about 3 or more). The polishing composition may have a pH of about 6 or less (e.g., about 5 or less, or about 4 or less).

The pH of the polishing composition may be achieved or maintained by any suitable means. The polishing composition may include substantially any suitable pH adjusting agents or buffering systems. For example, suitable pH adjusting agents may include nitric acid, sulfuric acid, phosphoric acid, phthalic acid, citric acid, adipic acid, oxalic acid, malonic acid, maleic acid, ammonium hydroxide, and the like, while suitable buffering agents may include phosphates, sulfates, acetates, malonates, oxalates, borates, ammonium salts, and the like.

The polishing composition includes cationic surfactant, which can be of any type that, in combination with the positively-charged colloidal silica abrasive particles and other optional ingredients, will produce a polishing composition effective to polish a tungsten-containing surface of a substrate. Preferred cationic surfactants may be effective to stabilize the polishing slurry (during storage and use), to allow for desired removal rate of tungsten and oxide (e.g., TEOS), and preferably to avoid high defectivity of a processed substrate. Optionally and preferably, the cationic surfactant exhibits relatively reduced particle size growth during storage and CMP processing as compared an otherwise comparable polishing slurry that does not contain cationic surfactant as described herein.

For the slurry to exhibit desirably low levels of particle growth and defectivity (caused by large particles that result from particle growth), while still exhibiting a useful or advantageous removal rate for tungsten, oxide (e.g., TEOS), or both, preferred cationic surfactants can be selected to have a combination of Log P and charge (n in Formula 1) that meets the formula:

$$8(n-1)+\text{Log } P \geq 1$$

Log P is a known and useful characterization of water-soluble surfactants and other chemical compounds. As used herein Log P refers to the octanol-water partition coefficient of a surfactant. The octanol-water partition coefficient is defined as the ratio of the concentration of a chemical in n-octanol and water at equilibrium at a specified temperature. It is assumed that the molecular speciation of the solute is the same in both solvents and that the solutions are sufficiently dilute. A general formula is provided below.

$$\log P_{oct/wat} = \log\left(\frac{[\text{solute}]_{octanol}}{[\text{solute}]_{water}}\right)$$

A Log P value of a cationic surfactant is the ratio of the concentration of the cationic surfactant in n-octanol, to the concentration of the cationic surfactant in water, when the n-octanol and the water are part of an immiscible mixture at equilibrium. The Log P values can be determined experimentally or predicted using commercially available software based on quantitative structure activity relationships. As is known to the skilled artisan, many compendia of Log P values of cationic surfactants are readily available. Examples of useful or preferred values of the 8(n−1)+Log P of the cationic surfactant may be at least 1.1, 1.5, 2, 2.2, 2.5, 3, or greater.

Certain exemplary cationic surfactants that have been found to be useful in the inventive polishing composition as described herein include cationic surfactants of Formula 1:

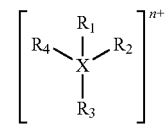

wherein
   n is at least 1;
   X is $P^+$ or $N^+$; and
   each of $R_1$, $R_2$, $R_3$, and $R_4$ can be independently selected from:
      hydrogen,
      a saturated or unsaturated cyclic group which may be substituted or unsubstituted and which may optionally include a charged group, a linear or branched alkyl group which may be saturated or optionally include unsaturation, and which may optionally include a saturated or unsaturated cyclic substituent group, any of which may be substituted or include a charged group, and a saturated or unsaturated ring structure formed from two or three of $R_1$, $R_2$, $R_3$, and $R_4$, the ring optionally being substituted, and wherein the value of n and the Log P of the cationic catalyst meet the formula:

$$8(n-1)+\text{Log } P \geq 1$$

In Formula 1, the X atom will be cationically charged in the polishing composition during use in a CMP process due to the polishing composition pH, e.g., the X atom will be $N^+$ or $P^+$ when present in the polishing composition during use. The cationic surfactant may be introduced into the polishing composition in any chemical form, such as in the form of a salt having a suitable counterion such as $NO_3^-$, $OH^-$, $Br^-$, etc.

According to certain preferred cationic surfactant compounds of Formula 1, $R_1$, $R_2$, $R_3$, and $R_4$, are not all hydrogen. Preferably, at least one of $R_1$, $R_2$, $R_3$, and $R_4$, is non-hydrogen; more preferably according to these embodiments at least two, three, or four of $R_1$, $R_2$, $R_3$, and $R_4$ are non-hydrogen. For example, each of $R_1$, $R_2$, $R_3$, and $R_4$ can independently be a linear alkyl group having from 1 to 12 carbon atoms, e.g., from 2 to 8 carbon atoms and optionally containing one or more heteroatoms such as nitrogen atoms, e.g., charged or uncharged nitrogen atoms. Alternately or in addition, one or more of $R_1$, $R_2$, $R_3$, and $R_4$ can include a cyclic alkyl or aromatic ring, optionally substituted and optionally containing a heteroatom such as nitrogen, e.g., an un-substituted 6-member alkyl or aromatic ring, or an aromatic or saturated nitrogen-containing ring. Also optionally, one or more of $R_1$, $R_2$, $R_3$, and $R_4$ can include a charged group such as an alkylated cationic ammonium group.

According to certain cationic surfactant compounds, each of $R_1$, $R_2$, $R_3$, and $R_4$ can be the same or different and can be an alkyl group having from 2 to about 8 carbon atoms (alternately 3 to 5 or 6 carbon atoms), e.g., a straight chain unsubstituted alkyl such as butyl, pentyl, etc. According to some such examples, each of $R_1$, $R_2$, $R_3$, and $R_4$ is the same and can be a $C_2$ through $C_8$ alkyl; examples include tetrabutylammonium hydroxide, tetrabutylammonium bromide, tetrabutylammonium nitrate, tetrapentylammonium bromide, tetrabutylphosphonium bromide, and the like, or other useful salts. According to other examples, each of $R_1$, $R_2$, $R_3$, and $R_4$ is a $C_2$ through $C_8$ alkyl, but all are not the same; examples include tributylmethylphosphonium methyl sulfate, tributyloctylphosphonium bromide, and other useful salts thereof.

According to certain cationic surfactant compounds, $R_1$ can be a substituted or unsubstituted aromatic ring optionally containing a heteroatom (e.g., benzyl), and each of $R_2$, $R_3$, and $R_4$ can be the same or different and can be an alkyl group having from 2 to about 8 carbon atoms, e.g., a straight chain unsubstituted alkyl such as butyl, pentyl, etc. According to some such examples, $R_1$ can be benzyl and each of $R_2$, $R_3$, and $R_4$ is the same and can be a $C_2$ through $C_8$ alkyl, examples being benzyltributylammonium bromide and other useful salts thereof.

According to certain other cationic surfactant compounds, $R_1$ can be as described, e.g., a straight or branched alkyl, optionally substituted or unsaturated, having from 1 to 12 carbon atoms, and $R_2$, $R_3$, and $R_4$ can combine to form an aromatic ring structure, which may optionally be substituted such as by another aromatic ring structure. According to some such examples, $R_1$ can be a straight chain unsubstituted, saturated alkyl such as a $C_2$ to $C_{12}$ alkyl, and $R_2$, $R_3$, and $R_4$ can form a six-carbon aromatic ring that may optionally be substituted by another alkyl, cycloaklyl, or aromatic ring structure, any of which may optionally include a heteroatom; exemplary compounds include 1-dodecylpyridinium chloride hydrate, 1-dodecylpyridinium chloride hydrate, 1-heptyl-4(4-pyridyl)pyridinium bromide, 1-(4-pyridyl)pyridinium chloride hydrochloride, methyl viologen dichloride, and other useful salts thereof.

According to certain other cationic surfactant compounds, $R_1$ can be hydrogen; $R_2$ and $R_3$ can be as described, e.g., each can be the same or different and can be an alkyl group having from 1 to 12 carbon atoms, e.g., a straight chain unsubstituted alkyl such as butyl, pentyl, etc.; and $R_4$ be a hetroatom-containing alkyl having from 4 to about 15 carbon atoms. According to some such examples, $R_1$ can be hydrogen; $R_2$ and $R_3$, can be the same or different and can be a lower alkyl such as methyl, ethyl, or butyl; and $R_4$ can be a nitrogen-containing alkyl group, optionally a group that contains multiple nitrogen compounds. Example include 1,1,4,7,10,10-hexamethyltriethylenetetramine and useful salts thereof.

Examples of cationic surfactants useful to the invention (inv.) are provided in Table 1, as are some comparisons cationic surfactants (comp.). Table 1 is intended to be instructive and not limiting in scope, the listed surfactants being exemplary.

TABLE 1

Cationic Surfactants

| Name | Type | Abbreviation | Charge | log P | equation value: (8 * (charge − 1) + log P)* |
|---|---|---|---|---|---|
| Tris(2-hydroxyethyl)methylammonium Hydroxide | comp. | THEMAH | 1 | −6.04 | −6.04 |
| Tetramethylammonium hydroxide | comp. | TMAH | 1 | −3.97 | −3.97 |
| Tetramethylammonium nitrate | comp. | TMAN | 1 | −3.97 | −3.97 |
| Tetrabutylammonium Hydroxide | Inv. | TBAH | 1 | 1.32 | 1.32 |
| Tetrabutylammonium Bromide | Inv. | TBAB | 1 | 1.32 | 1.32 |
| Tetrabutylammonium nitrate | Inv. | TBAN | 1 | 1.32 | 1.32 |
| Benzyltributylammonium bromide | Inv. | BTAB | 1 | 1.72 | 1.72 |
| Tetrapentylammonium bromide | Inv. | TPAB | 1 | 3.1 | 3.1 |
| Hexamethonium bromide | Inv. | HMB | 2 | −6.65 | 1.35 |
| Tributylmethylphosphonium methyl sulfate | Inv. | TBMPMS | 1 | 4.35 | 4.35 |

TABLE 1-continued

Cationic Surfactants

| Name | Type | Abbreviation | Charge | log P | equation value: (8 * (charge − 1) + log P)* |
|---|---|---|---|---|---|
| 1,1,4,7,10,10-Hexamethyltriethylenetetramine | Inv. | HMTT | 3 | 0.25 | 16.25 |
| Tetrabutylphosphonium bromide | Inv. | TBPB | 1 | 5.57 | 5.57 |
| Tributyl-n-octylphosphonium Bromide | Inv. | TBOPB | 1 | 7.35 | 7.35 |
| 1-Dodecylpyridinium chloride hydrate | Inv. | DDPC | 1 | 1.69 | 1.69 |
| 1-Hepty1-4-(4-pyridyl)pyridinium bromide | Inv. | HPPB | 2 | −4.04 | 3.96 |
| 1-(4-Pyridyl)pyridinium chloride hydrochloride | Inv. | PPC | 2 | −5.31 | 2.69 |
| Methyl viologen dichloride | Inv. | MVC | 2 | −6.7 | 1.3 |

*pH value of 4 used for calculating charge for titratable groups.

The cationic surfactant can be included in the slurry in any amount effective to provide desired processing performance properties of the slurry when polishing a tungsten-containing substrate surface, such properties including one or more of a desired tungsten removal rate, desired oxide (e.g., TEOS) removal rate, useful or low particle size growth, and useful or low defectivity as measured by scratching or residue. Particular amounts of cationic surfactant may depend on factors such as the specific substrate being processed (e.g., polished) and the other ingredients in the slurry, such as the type and amount of abrasive particles, catalyst, inhibitor, etc. In certain useful embodiments the cationic surfactant can be present in the polishing composition in an amount in a range from about 0.1 to about 5,000 parts per million (ppm) based on the total weight of the polishing composition. The polishing composition may preferably include about 1 ppm cationic surfactant or more (e.g., about 5 ppm or more, about 10 ppm or more, or about 20 ppm or more). The polishing composition may preferably include about 1,000 ppm cationic surfactant or less (e.g., about 500 ppm or less, 200 ppm or less, about 100 ppm or less, or about 50 ppm or less). The polishing composition may thus include a range from about 1 to about 500 ppm cationic surfactant (e.g., from about 3 to about 200 ppm, from about 5 to about 100 ppm, or from about 10 to about 50 ppm).

Embodiments of the polishing composition may optionally include catalyst that will be effective in processing (e.g., polishing) a tungsten-containing surface of a substrate. The catalyst may contain a metal, which can be any metal, such as iron. Iron-containing catalysts effective to increase the removal rate of tungsten during a tungsten CMP operation are well known. Examples of soluble iron-containing catalysts are described in U.S. Pat. Nos. 5,958,288 and 5,980,775. Such an iron-containing catalyst may be soluble in the liquid carrier and may include, for example, ferric (iron III) or ferrous (iron II) compounds such as iron nitrate (e.g. ferric nitrate), iron sulfate, iron halides (including fluorides, chlorides, bromides, and iodides, as well as perchlorates, perbromates and periodates), and organic iron compounds such as iron acetates, acetylacetonates, citrates, gluconates, malonates, oxalates, phthalates, and succinates, and mixtures thereof.

The polishing composition may also include an iron-containing catalyst associated with (e.g., coated or bonded to) the surface of the colloidal silica particle such as is disclosed in U.S. Pat. Nos. 7,029,508 and 7,077,880. In embodiments described therein, the particles may also contain a boron-containing stabilizer along with iron-containing catalyst. In such embodiments the stabilizer and catalyst may occupy substantially any percentage of the available surface sites on the colloidal silica particles, for example, greater than 1%, greater than 50%, or greater than 80% of the available surface sites.

The amount of iron-containing catalyst in the polishing composition may be varied depending upon the presence and type of oxidizing agent (if any, see below) and the chemical form of the catalyst. When hydrogen peroxide (or an analog) is used as an oxidizing agent and iron-containing catalyst is used (such as ferric nitrate), the catalyst may be present in the composition in an amount sufficient to provide a range from about 0.1 to about 3000 ppm Fe based on the total weight of the composition. The polishing composition preferably includes about 1 ppm Fe or more (e.g., about 5 ppm or more, about 10 ppm or more, or about 20 ppm or more). The polishing composition preferably includes about 500 ppm Fe or less (e.g., about 200 ppm or less, about 100 ppm or less, or about 50 ppm or less). The polishing composition may thus include a range from about 1 to about 500 ppm Fe (e.g., from about 3 to about 200 ppm, from about 5 to about 100 ppm, or from about 10 to about 50 ppm).

A polishing composition that includes iron-containing catalyst may also include a stabilizer. Without a stabilizer, the iron-containing catalyst and the oxidizing agent may react in a manner that degrades the oxidizing agent rapidly over time. The addition of a stabilizer tends to reduce the effectiveness of the iron-containing catalyst such that the choice of the type and amount of stabilizer added to the polishing composition may have a significant impact on CMP performance. The addition of a stabilizer may lead to the formation of a stabilizer-catalyst complex that inhibits the catalyst from reacting with the oxidizing agent (e.g., hydrogen peroxide) while at the same time allowing the catalyst to remain sufficiently active to promote rapid tungsten polishing rates.

Exemplary stabilizers include phosphoric acid, organic acids, phosphonate compounds, nitriles, and other ligands which bind to the metal of the catalyst compound and reduce its reactivity toward an oxidizing agent (e.g., hydrogen peroxide) decomposition. The acid stabilizers may be used in their conjugate forms, e.g., the carboxylate can be used instead of the carboxylic acid. For purposes of this application the term "acid" as it is used to describe useful stabilizers also means the conjugate base of the acid stabilizer. For example the term "adipic acid" means adipic acid and its conjugate base. Stabilizers can be used alone or in combination and significantly decrease the rate at which oxidizing agents such as hydrogen peroxide decomposes.

Preferred stabilizers include phosphoric acid, acetic acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid (EDTA), propylenediaminetetraacetic acid (PDTA), and mixtures thereof. The preferred stabilizers may be included in a composition as described in an amount ranging from about 1 equivalent per iron-containing catalyst to about 3.0 weight percent or more. As used herein, the term "equivalent per iron-containing catalyst" means one molecule of stabilizer per iron ion in the composition. For example 2 equivalents of stabilizer per iron-containing catalyst means two molecules of stabilizer for each catalyst ion.

The polishing composition may optionally include oxidizing agent. Oxidizing agent may be added to the polishing composition during the slurry manufacturing process or just prior to a CMP operation (e.g., in a tank located at a semiconductor fabrication facility). Exemplary oxidizing agents include inorganic and organic per-compounds. A per-compound as defined by Hawley's Condensed Chemical Dictionary is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-t-butyl peroxide, monopersulfates ($SO_5^-$), dipersulfates ($S_2O_8^-$), and sodium peroxide. Examples of compounds that contain an element in its highest oxidation state include but are not limited to periodic acid, periodate salts, perbromic acid, perbromate salts, perchloric acid, perchlorate salts, perboric acid, and perborate salts and permanganates. An often-preferred oxidizing agent is hydrogen peroxide.

Oxidizing agent may be included in a polishing composition in an amount ranging, for example, from about 0.1 to about 10 weight percent. In preferred embodiments in which a hydrogen peroxide oxidant and a soluble iron-containing catalyst are used, the oxidant may be present in the polishing composition in an amount ranging from about 0.1 to about 6 weight percent (e.g., from about 0.2 to about 5 weight percent, from about 0.3 to about 4 weight percent, or from about 0.5 to about 3 weight percent).

The polishing composition may also contain an inhibitor compound, e.g., a nitrogen-containing inhibitor compound that is effective to inhibit the conversion of solid tungsten into soluble tungsten compound, while at the same time allowing for an effective removal rate of solid tungsten during CMP processing. The inhibitor may be a nitrogen-containing inhibitor compound that is different from the compounds of Formula 1. Like cationic surfactant of Formula 1, a nitrogen-containing inhibitor can be selected to produce a slurry that exhibits a desired removal rate of tungsten, oxide (e.g., TEOS), or both, during polishing. The nitrogen-containing inhibitor can also be selected so that the slurry will not exhibit undue particle size growth during CMP processing, as a consequence not producing an increase in defects such as residue or scratching caused by particle growth during processing.

Classes of compounds that are useful inhibitors of tungsten etching include compounds having nitrogen-containing functional groups such as nitrogen-containing heterocycles, alkyl ammonium ions, amino alkyls, and amino acids. Useful amino alkyl corrosion inhibitors include, for example, hexylamine, tetramethyl-p-phenylene diamine, octylamine, diethylene triamine, dibutyl benzylamine, aminopropylsilanol, aminopropylsiloxane, dodecylamine, mixtures thereof, and synthetic and naturally occurring amino acids including, for example, lysine, tyrosine, glutamine, glutamic acid, cystine, glycine (aminoacetic acid).

In certain embodiments of the polishing composition the amine compound may include a polycationic amine. Diquaternary amine compounds may include, for example, N,N'-methylenebis(dimethyltetradeclammonium bromide), 1,1,4,4-tetrabutylpiperazinediium dibromide, N,N,N',N',N'-pentamethyl-N-tallow-1,3-propane-diammonium dichloride, dimethyl-1,5-diazoniabicyclo(3.2.2)nonane dibromide, N,N,N',N',N'-pentamethyl-N-tallow-1,3-propane-diammonium dichloride, didodecyl-tetramethyl-1,4-butanediaminium diiodide, or N(1),N(6)-didodecyl-N(1),N(1),N(6),N(6)-tetramethyl-1,6-hexanediaminium diiodide.

The polishing composition may include substantially any suitable concentration of inhibitor compound. In general the concentration is desirably high enough to provide adequate etch inhibition but low enough so that the compound is soluble and so as not to reduce tungsten polishing rates below acceptable levels. By soluble it is meant that the compound is fully dissolved in the liquid carrier or that it forms micelles in the liquid carrier or is carried in micelles. It may be necessary to vary the concentration of the inhibitor compound depending upon various factors, for example, including the solubility thereof, the number of amine groups therein, the length of an alkyl group, the relationship between etch rate inhibition and polishing rate inhibition, the oxidizing agent used, the concentration of the oxidizing agent, and so on. In certain desirable embodiments, the concentration of tungsten inhibitor compound in a polishing composition may be in a range from about 0.1 μM to about 10 mM (i.e., from about $10^{-7}$ to about $10^{-2}$ molar). For example, in embodiments using an amine-based polymer having a high molecular weight, the concentration may be on the lower end of the range (e.g., from about $10^{-7}$ to about $10^{-4}$ molar). In other embodiments using a comparatively simple amine compound (having fewer amine groups and a lower molecular weight), the concentration may be on the higher end of the range (e.g., from about $10^{-5}$ to about $10^{-2}$ molar).

In certain chemical mechanical polishing applications (e.g., shallow trench applications) tungsten and silicon oxide may be polished in combination with a silicon nitrogen material such as silicon nitride (SiN). In particular applications it may be desirable to achieve a high removal rate for both the silicon oxide and the silicon nitrogen material (e.g., such that a TEOS:SiN polishing rate selectivity is less than about 15:1 and such that the TEOS and SiN polishing rates are greater than the tungsten polishing rate). The chemical mechanical polishing composition may therefore optionally further include a silicon nitrogen polishing accelerator. The silicon nitrogen polishing accelerator may include, for example, substantially any suitable poly acid such as a polycarboxylic acid, a poly phosphonic acid, or a mixture of these. Example polycarboxylic acids may include, for example, oxalic acid, malonic acid, succinic acid, glutaric acid, adipic acid, tartaric acid, sulfosuccinic acid, and phthalic acid. It will be understood that such polycarboxylic acids may generally be used in their conjugate form, e.g., the carboxylate can be used instead of the carboxylic acid. For the purposes of this application the term "acid" as it is used to describe useful silicon nitrogen accelerators also means the conjugate base (or bases) of the acid.

Suitable poly phosphonic acids may include for example, methylene phosphonic acid compounds and diphosphonic acid compounds such as 1-hydroxyethylidene-1,1,-diphosphonic acid, amino tri(methylene phosphonic acid), diethylenetriamine penta(methylene phosphonic acid), and bis(hexamethylene triamine penta(methylenephosphonic acid)). It will be understood that such poly phosphonic acids may generally be used in their conjugate form, e.g., the phosphonate can be used instead of the phosphonic acid (as described above with respect to the carboxylic acids). Suitable examples of the above-described poly phosphonic acid compounds are sold under the Dequest® trade name (Italmatch Chemicals, Genova, Italy).

A polishing composition may optionally further include a uniformity additive for improving the within-wafer uniformity of the polishing rate (e.g., a wafer edge to center polishing rate ratio or difference), such as a polyethylene glycol.

The polishing composition may optionally further include a biocide. The biocide may include any suitable biocide, for example an isothiazolinone biocide. The amount of biocide in the polishing composition may be in a range from about 1 ppm to about 50 ppm, and preferably from about 1 ppm to about 20 ppm.

Certain embodiments of the described polishing compositions have been observed to achieve a higher silicon dioxide (TEOS) polishing rate when the electrical conductivity of the polishing composition is low. Such embodiments may be advantageously used for tungsten buffing applications. Example polishing compositions may therefore advantageously have an electrical conductivity of less than 2000 $\mu$S/cm (e.g., less than 1500 $\mu$S/cm, less than 1000 $\mu$S/cm, less than 800 $\mu$S/cm, less than 500 $\mu$S/cm, or less than 400 $\mu$S/cm, or less than 300 $\mu$S/cm).

Certain embodiments of the polishing compositions, specifically designed for processing a tungsten-containing substrate surface, can also exclude or minimize ingredients that are present in CMP slurries designed for processing other types of substrates, such other types of ingredients being present at not more than a low amount or an amount that is insignificant, e.g., an amount that is sufficiently low to prevent a noticeable detrimental effect on performance of the slurry in a CMP process such as a tungsten-polishing CMP process.

For example, certain embodiments of the described polishing compositions can either exclude entirely, or include not more than a very low level of surfactant that is different from cationic surfactant defined herein. These embodiments can include not more than a low level or insignificant level of anionic surfactant or nonionic surfactant, e.g., polyvinyl alcohol surfactant, polyethylene glycol surfactant, polyacrylate surfactant, polyoxyethylene surfactant. For example these embodiments can include not more than 0.1, 0.05, or 0.01 weight percent of any of these non-cationic surfactants separately or in combination based on total weight of the composition. Examples of certain surfactants different from the cationic surfactant described herein, which can optionally be excluded from the a slurry as presently described or used at a low or very low level, are described in U.S. Pat. No. 6,979,252, the disclosure of which is incorporated herein by reference.

As another example, certain embodiments of a polishing composition as described can either exclude entirely, or include not more than a very low level of abrasive particles that are different from colloidal silica particles such as those described herein. Stated differently, the abrasive particles of these embodiments can include the described colloidal silica abrasive particles useful in combination with the described cationic surfactant, and can either entirely exclude or can contain not more than a small or insubstantial amount of other types of abrasive particles; i.e., the abrasive particles of the slurry can consist of or consist essentially of cationically-charged colloidal silica abrasive particles. As used herein abrasive particles that "consist essentially of" the specified tungsten-polishing particles means that the abrasive particles do not contain more than an insubstantial amount of any other type of abrasive particles, e.g., contain not more than 3, 2, or 1 percent, e.g., not more than 0.5, 0.1, 0.05, or 0.01 weight percent of another type of abrasive particle based on the total weight of abrasive particles in the polishing composition.

The polishing composition may be prepared using any suitable technique, many of which are known to those skilled in the semiconductor materials arts. The polishing composition may be prepared in a batch or continuous process. Generally, the polishing composition may be prepared by combining the components thereof in any order. The term "component" as used herein refers to a discrete ingredient of the composition, e.g., the colloidal silica or a dispersion thereof, cationic surfactant, optional catalyst (e.g., iron-containing catalyst), etc.).

The positively-charged colloidal silica abrasive particles may be prepared by steps that include growing the particles in an aqueous liquid carrier, and incorporating a chemical compound at the interior or at the surface of the particles (still in dispersion) to provide the particles with a charge, as described herein. The resulting dispersion may then be diluted and the pH adjusted to a predetermined value, for example, by adding acid. Other components such as the cationic surfactant, optional catalyst, optional stabilizer, and optional inhibitor, may then be added and mixed by any method that is useful to uniformly incorporate those added components into the polishing composition. The oxidizing agent may be added at any time during the preparation of the polishing composition. For example, the polishing composition may be prepared prior to use, with one or more components, such as the oxidizing agent, being added just prior to use of the polishing composition in a CMP operation (e.g., within about 1 minute, or within about 10 minutes, or within about 1 hour, or within about 1 day, or within about 1 week of the CMP operation). The polishing composition also may also be prepared by mixing the components at the surface of the substrate (e.g., on the polishing pad) during the CMP operation.

The polishing composition may be supplied as a one-package system that contains the charged colloidal silica particles, cationic surfactant, optional catalyst (e.g., iron-containing catalyst), optional inhibitor, an optional stabilizer, an optional biocide, and water. In certain embodiments the oxidizing agent is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use).

The polishing composition may advantageously be provided as a concentrate that is intended to be diluted with an appropriate amount of water before use. In such an embodiment, the polishing composition concentrate may include the charged colloidal silica abrasive particles and other optional components in amounts such that, upon dilution of the concentrate with an appropriate amount of water each component of the polishing composition will be present in the polishing composition in an amount within the appropriate range recited above for each component. For example, the colloidal silica abrasive particles may be present in the polishing composition in an amount that is about 2 times (e.g., about 3 times, about 4 times, about 5 times, or even about 10 times) greater than the concentration recited above for each component so that when a volume of the concentrate is diluted with an equal volume of water (alternately 2, 3, 4, or even 9 equal volumes of water, respectively), each component will be present in the diluted polishing composition in an amount within a range set forth above. Furthermore, as will be understood, the concentrate may contain an appropriate fraction of the water present in the final polishing composition, to ensure that other components are at least partially or fully dissolved in the concentrate.

In one embodiment, a suitable concentrated polishing composition includes at least 10 weight percent of one of the colloidal silica abrasive particles dispersed in a water based liquid carrier (e.g., a colloidal silica including a nitrogen containing compound such as an aminosilane compound or a phosphorus containing compounds such as a phosphonium silane compound incorporated internal to an outer surface of the particles), along with the cationic surfactant. The colloidal silica particles may have a permanent positive charge of at least 6, 8, or 10 mV. The concentrated composition may further include an iron-containing catalyst and other optional components described above. Moreover, the pH of the composition may be in a range from about 1 to about 6, e.g., from 2 to about 5.

Although a polishing composition as described may be used to polish any substrate, exemplary compositions can be particularly useful in polishing a substrate surface that includes at least one metal (e.g., tungsten) and at least one dielectric material. The tungsten layer may be deposited over one or more barrier layers, for example titanium or titanium nitride (TiN). The dielectric layer may be a metal oxide such as a silicon oxide layer derived from tetraethylorthosilicate (TEOS), porous metal oxide, porous or nonporous carbon-doped silicon oxide, fluorine-doped silicon oxide, glass, organic polymer, fluorinated organic polymer, or any other suitable high or low-k insulating layer.

In one embodiment a method of chemical mechanical polishing a substrate including tungsten and a silicon oxygen material (such as TEOS) makes use of one of the described polishing compositions, for example, having an acidic pH and less than about 4 weight percent charged colloidal silica abrasive particles. In such an embodiment, an average removal rate of TEOS may be greater than 200 angstroms per minute (Å/min) at 2.0 psi downforce (or even greater than 500 Å/min or even greater than 1000 Å/min). Moreover, the removal rate of TEOS may be greater than the removal rate of tungsten (i.e., the TEOS:W selectivity may be greater than 1). In an embodiment in which the substrate further includes a silicon nitrogen material, the removal rate of the silicon nitrogen material may also be greater than the removal rate of tungsten.

In another embodiment, a method of chemical mechanical polishing a substrate including tungsten and a silicon oxygen material (such as TEOS) makes use of a polishing composition as described, for example, having a pH less than 4.5 and less than about 2 weight percent charged silica abrasive particles. In such an embodiment, an average removal rate of tungsten may be greater than 100 Å/min at a downforce of 2.5 psi (or even greater than 500 Å/min or even greater than 1000 Å/min). Such polishing rates may be achieved on wafers having substantially any suitable diameter, for example, on 200 mm diameter wafers, 300 mm diameter wafers, or 450 mm diameter wafers.

A polishing method as described may be particularly suited for use in conjunction with a chemical-mechanical polishing (CMP) apparatus. Typically, the apparatus includes a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate (such as tungsten, titanium, titanium nitride, and/or a dielectric material as described herein) to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

It will be understood that the disclosure includes numerous embodiments. These embodiments include, but are not limited to, the following numbered embodiments.

1. A chemical mechanical planarization polishing composition useful for processing a tungsten-containing surface, the composition comprising:
  liquid carrier,
  silica abrasive particles dispersed in the liquid carrier, the particles having a positive charge of at least 8 millivolts (mV) in the slurry at a pH of from 1 to 6, and
  cationic surfactant of Formula 1:

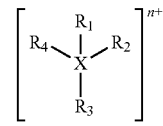

wherein
  n is at least 1;
  X is $P^+$ or $N^+$; and
  each of $R_1$, $R_2$, $R_3$, and $R_4$ can be independently selected from:
    hydrogen,
    a saturated or unsaturated cyclic group which may be substituted or unsubstituted and which may optionally include a charged group,
    a linear or branched alkyl group which may be saturated or optionally include unsaturation, and which may include a saturated or unsaturated cyclic group, any of which may be substituted or include a charged group, and
    a saturated or unsaturated ring structure formed from two or three of $R_1$, $R_2$, $R_3$, and $R_4$, the ring optionally being substituted, and wherein the value of n and the Log P of the cationic catalyst meet the formula:

$$8(n-1)+\text{Log } P \geq 1$$

2. A polishing composition of embodiment 1 wherein each of $R_1$, $R_2$, $R_3$, and $R_4$ is independently a linear alkyl group having from 1 to 12 carbon atoms or from 2 to 8 carbon atoms.

3. A polishing composition of embodiment 2 wherein the cationic surfactant includes one or a combination of: tetrabutylammonium, tetrapentylammonium, tetrabutylphosphonium, tributylmethylphosphonium, tributyloctylphosphonium, or a salt thereof.

4. A polishing composition of embodiment 1 wherein each of $R_1$, $R_2$, and $R_3$ is independently a linear alkyl group each having from 1 to 12 carbon atoms or each having from 2 to 8 carbon atoms, and $R_4$ is a group that includes a cyclic alkyl or aromatic ring optionally substituted and optionally containing a heteroatom.

5. A polishing composition of embodiment 4 wherein the cationic surfactant is benzyltributylammonium bromide or a salt thereof.

6. A polishing composition of embodiment 1 wherein $R_1$ is a straight or branched alkyl group optionally substituted or unsaturated and having from 1 to 12 carbon atoms or from 2 to 8 carbon atoms, and wherein $R_2$, $R_3$, and $R_4$ form an aromatic ring structure that may optionally be substituted, for example, by a group that contains a saturated or aromatic ring structure.

7. A polishing composition of embodiment 6 wherein the cationic surfactant includes one or a combination of: 1-dodecylpyridinium, 1-dodecylpyridinium, 1-heptyl-4(4-pyridyl)pyridinium, 1-(4-pyridyl)pyridinium, methyl viologen, or a salt thereof.

8. A polishing composition of embodiment 1 wherein $R_1$ is hydrogen; $R_2$ and $R_3$ are each independently an alkyl group each having from 1 to 12 carbon atoms or each having from 2 to 8 carbon atoms; and $R_4$ is a hetroatom-containing alkyl having from 4 to about 15 carbon atoms; and $R_4$ is be a nitrogen-containing alkyl group.

9. A polishing composition of embodiment 8 wherein the cationic surfactant is 1,1,4,7,10,10-hexamethyltriethylenetetramine or useful salts thereof.

10. A polishing composition as recited at any of embodiments 1 through 9 comprising nitrogen-containing inhibitor compound that is not a cationic surfactant according to Formula 1.

11. A polishing composition of embodiment 10 wherein the nitrogen-containing inhibitor compounds includes at least one nitrogen group and at least one carboxylic acid group.

12. A polishing composition of embodiment 10 or 11 wherein the nitrogen-containing inhibitor compound contains at least two nitrogen groups.

13. A polishing composition of any of embodiments 1 through 12 comprising metal-containing catalyst.

14. A polishing composition of any of embodiments 1 through 13 comprising from about 0.5 to about 4 weight percent of the silica abrasive particles.

15. A polishing composition of any of embodiments 1 through 14 comprising from about 92 to about 99 weight percent water based on total weight of the polishing composition.

16. A polishing composition of any of embodiments 1 through 15 wherein 30 percent or more of the silica abrasive particles include from 3 to 10 aggregated primary particles.

17. A polishing composition of any of embodiments 1 through 16 wherein the silica abrasive particles include a cationic compound incorporated into the particles, and wherein the cationic compound is a charged nitrogen-containing compound or a charged phosphorous-containing compound, in the polishing composition.

18. A polishing composition of any of embodiments 1 through 17 wherein the silica abrasive particles have a permanent positive charge of at least 10 millivolts.

19. A polishing composition of any of embodiments 1 through 18 comprising from 0.1 to 5,000 parts per million of the cationic surfactant.

20. A method of chemical mechanical polishing a substrate that includes a surface comprising tungsten, the method comprising:
  (a) contacting the substrate with a polishing composition as recited at any of embodiments 1 through 19;
  (b) moving the polishing composition relative to the substrate; and
  (c) abrading the substrate to remove a portion of the tungsten from the substrate.

21. A method of embodiment 20 wherein the polishing composition comprises less than 4 weight percent abrasive particles based on total weight of the polishing composition, during contacting.

22. A method of embodiment 20 wherein the polishing composition comprises less than 3 weight percent abrasive particles based on total weight of the polishing composition, during contacting.

23. A method of embodiment 20, 21, or 22 comprising
  providing a concentrated polishing composition having a concentration of at least about 3 weight percent of the silica abrasive particles,
  diluting the concentrated polishing composition with water to produce a polishing composition having a concentration below 3 weight percent silica abrasive particles,
  contacting the substrate with the polishing composition remove a portion of the tungsten from the substrate.

24. A method of embodiment 23 comprising
  providing the concentrated polishing composition having a concentration in a range from greater than 3 weight percent to 10 weight percent silica abrasive particles,
  diluting the concentrated polishing composition with water to produce the polishing composition having a concentration in a range from 1 to 3 weight percent silica abrasive particles.

EXAMPLE 1

This example demonstrates the advantage of inventive compositions formulated for tungsten buffing applications prepared with positively charged colloidal silica of the type disclosed in the present description and cationic surfactant compound with regard to blanket polishing performance (defect) as compared to colloidal silica of the type known in the art. In each set, the comparative and inventive slurries were prepared in the same manner, except that the inventive slurries were formulated with cationic surfactant as described. The compositions are set forth in Table 1. One type of silica abrasive particles is referred to as Silica-A, which is a charged colloidal silica particle having a secondary particle size of about 50 nm and a charge of about 12 mV. The Silica-B particles are colloidal silica particles having a secondary particle size of about 55 nm and a charge of ca 25 mV. Both types of particle are charged by use of an "internal" charged material being incorporated into the particles, as described in the Detailed Description of the invention.

TABLE 2

Slurry Compositions.

| Formula ID | type | Abr. | Abr. (%) | pH | Cat. | MA (%) | Surf. (%) | $H_2O_2$ (%) |
|---|---|---|---|---|---|---|---|---|
| 1-A | Comp. | Silica-A | 3 | 3 | 0.001 | 0.003 | 0 | 2 |
| 1-B | Comp. | Silica-B | 3 | 4 | 0.002 | 0.004 | 0 | 2 |
| 1-C | Inv. | Silica-B | 3 | 4 | 0.002 | 0.004 | 0.01 | 2 |

Abr. = abrasive; cat = iron nitrate nonahydrate; MA = malonic acid; Surf. = surfactant (TBAH).

The blanket defect polishing performances of the comparative and inventive slurries are shown in Table 3. It is clear that the inventive slurry exhibits an advantage over the comparative slurries in terms of lowered defect counts. The inventive composition exhibits a defect count that is approximately one-sixth the defect count of the comparative slurry.

TABLE 3

Slurry Polishing Results (apparatus = LK (Reflexion), pad = IC1010 (Dow), A3700 conditioner (3M Company), pressure = 1.5 psi (downforce, DF), PS/HS 93/87 rpm) (platen speed/head speed).

| formula | Defect counts (thermal oxide, >70 nm) |
|---|---|
| 1-A | 1040 |
| 1-B | 639 |
| 1-C | 153 |

EXAMPLE 2

This example demonstrates the advantage of inventive compositions with regard to pattern polishing. The inventive formulations are formulated for tungsten buffing applications prepared with positively charged colloidal silica comprising cationic surfactants of the invention and are compared to compositions which do not contain the cationic surfactants. The pattern polishing results are presented in Table 4. It is clear that the inventive slurries have numerous advantages over the comparative slurries in terms of reduced erosion. For example, the inventive composition exhibits a level of erosion that is approximately one third the level of erosion produced by the comparative slurry.

TABLE 4

Slurry Polishing Results (LK, IC1010, A3700 cond., 1.5 psi DF, PS/HS 93/87 rpm)

| Entry | formula | type | Erosion (A, 1.5 μm × 0.5 μm) |
|---|---|---|---|
| 4-A | 1-A | Comp. | 150 |
| 4-B | 1-C | Inv. | 50 |

EXAMPLE 3

This example shows the advantage of inventive slurries with regard to particle stability for slurries formulated according to the invention using colloidal silica without a permanent cationic charge as defined in the invention as compared to slurries otherwise identical but not containing cationic surfactant of the invention. The slurry compositions are set forth in Table 5. The stability data are set forth in Table 6. The slurries were prepared with the same colloidal silica (CS) obtained from Fuso, Inc., with a secondary particle size as determined by dynamic light scattering of ca 110 nm. The particles are modified with slurry chemistry (surfactants) to have a positive charge. The positive charge is not internal.

TABLE 5

Slurry Compositions

| Form. ID | type | Abr. | Abr. (%) | pH | Cat. | MA (%) | glycine | Surf. | Surf. (%) |
|---|---|---|---|---|---|---|---|---|---|
| 5-A | Comp. | CS | 4 | 2.3 | 0.002 | 0.005 | 0.3 | none | |
| 5-B | Inv. | CS | 4 | 2.3 | 0.002 | 0.005 | 0.3 | TBPH | 0.03 |
| 5-C | Inv. | CS | 4 | 2.3 | 0.002 | 0.005 | 0.3 | TBPH | 0.15 |

Abr. = abrasive; CS = colloidal silica; Cat. = iron nitrate nonahydrate; MA = malonic acid; Surf. = surfactant

TABLE 6

Particle Stability

| Form. ID | type | ζ (zeta) (mV) | PS initial (μm) | PS 2 wk (45° C.) (μm) | Settling |
|---|---|---|---|---|---|
| 5-A | Comp. | 1 | 0.1 | >1 | yes |
| 5-B | Inv. | 7 | 0.1 | 0.1 | no |
| 5-C | Inv. | 10 | 0.1 | 0.1 | no |

The stability data presented in Table 6 clearly demonstrate the advantages of the inventive slurry compositions in terms of improved shelf-life. For example, after 2 weeks at 45° C., the inventive formulations 5B and 5C show no change in particle size and no settling of the abrasive is observed, whereas the comparative slurry 5A formulated without surfactant shows a significant increase in particle size of at least 10× and settling of the abrasive is observed.

EXAMPLE 4

This example shows an advantage of polishing compositions of the invention with respect to blanket removal rates.

TABLE 7

Slurry Formulations.

| Form. ID | Abr. | Abr. (%) | pH | Cat. (%) | MA (%) | Inhib. | Kathon | BCD |
|---|---|---|---|---|---|---|---|---|
| 4A | Silica-B | 4 | 3.8 | 0.004 | 0.008 | 0.006 | 0.002 | 0 |
| 4B | Silica-B | 4 | 3.8 | 0.004 | 0.008 | 0.006 | 0.002 | 0.04 |

Abr. = abrasive; Cat. = iron nitrate nonahydrate; MA = malonic acid; Inhib. = N,N,N',N'-pentamethyl-N-tallow-1,3-propanediammoinium dichloride; BCD = β-cyclodextrin In this example, inventive and comparative cationic surfactants and cationic polymers were added to a common concentrate. The base concentrate is provided in Table 7.

The general procedure for preparing the slurries was to dissolve the cationic surfactant or polymer in water and mix with an equivalent amount of concentrate 4A or 4B and adjust the pH value to 4 with nitric acid or potassium hydroxide as required and add hydrogen peroxide.

The formulations are set forth in Table 8.

TABLE 8

Slurry Formulations

| Form. ID | type | Base | Abr. (%) | pH | Surf. | Surf. (%) | $H_2O_2$ (%) |
|---|---|---|---|---|---|---|---|
| 8a | Comp. | 4A | 2 | 4 | none | none | 2% |
| 8b | Comp. | 4B | 2 | 4 | none | none | 2% |
| 8c | Comp. | 4A | 2 | 4 | Poly-DADMAC | 0.01 | 2% |
| 8d | Inv. | 4B | 2 | 4 | BTMAH | 0.01 | 2% |
| 8e | Inv. | 4B | 2 | 4 | TBPH | 0.01 | 2% |
| 8f | Comp. | 4B | 2 | 4 | CTAB | 0.015 | 2% |
| 8g | Inv. | 4B | 2 | 4 | TMOAB | 0.02 | 2% |
| 8h | Inv. | 4B | 2 | 4 | TPAB | 0.03 | 2% |
| 8i | Inv. | 4B | 2 | 4 | HMB | 0.014 | 2% |
| 8j | Inv. | 4B | 2 | 4 | HPPBr | 0.02 | 2% |
| 8k | Inv. | 4B | 2 | 4 | TBMP | 0.025 | 2% |

(Poly-DADMAC = poly(diallyldimethylammonium chloride) and CTAB = cetyltrimethylammonium bromide.)

The polishing parameters are provided in Table 9, and the polishing results are presented in Table 10.

TABLE 9

Polishing conditions.
Mirra Settings (pad = IC1010)

| IT (psi) | RR (psi) | MP (psi) | PS (rpm) | HS (rpm) | Flow Rate (FR) (mL/min) | dresser type | dresser DF/lbs | dressing |
|---|---|---|---|---|---|---|---|---|
| 1.5 | 2.8 | 1.5 | 100 | 101 | 180 | 3M A3700 | 4 | ex situ-12 s |

Abr. = abrasive; Surf = surfactant

TABLE 10

Polishing Results

| Formula ID | type | TEOS RR (Å/min) | W RR (Å/min) |
|---|---|---|---|
| 8a | Comp. | 1260 | 820 |
| 8b | Comp. | 1209 | 624 |
| 8c | Comp. | 3 | 186 |
| 8d | Inv. | 1192 | 587 |
| 8e | Inv. | 1121 | 507 |
| 8f | Comp. | 1146 | 57 |
| 8g | Inv. | 1131 | 478 |
| 8h | Inv. | 1143 | 485 |
| 8i | Inv. | 1034 | 498 |
| 8j | Inv. | 1051 | 416 |
| 8k | Inv. | 1212 | 514 |

It is evident that the polishing compositions of the invention formulated with cationic surfactant according to the invention demonstrate improved polishing performance. For example, the comparison slurry 8c formulated with a cationic polymer poly-DADMAC has less than 1% of TEOS RR and only about 25% of the W RR of the same slurry formulated without this polymer (8a). Likewise, comparison slurry 8f, formulated with a cationic surfactant outside the selected cationic surfactants of the invention, has a significantly reduced blanket RR performance compared to the corresponding control slurry (8b). The comparison slurry has less than 10% of the W RR of the control slurry 8B. By contrast the inventive polishing compositions show much smaller changes in blanket RR compared to the corresponding slurry without surfactant. For example, 8g of the invention has 93% of the TEOS RR and 77% of the W RR as compared to the 8b control.

EXAMPLE 5

This example shows an advantage of polishing compositions of the invention with respect particle stability for cationic particles having a permanent cationic charge. The general procedure for preparation of the slurries was to dissolve the cationic surfactant or polymer in water and mix with an equivalent amount of concentrate 11A or 11B and adjust the pH value with nitric acid or potassium hydroxide as required.

TABLE 11

Base Formulations

| Form. ID | Abr. | Abr. (%) | pH | Cat. (%) | MA (%) | Inhib. | Kathon |
|---|---|---|---|---|---|---|---|
| 11A | Silica-A | 4 | 3 | 0.002 | 0.005 | 0.005 | 0.002 |
| 11B | Silica-B | 4 | 4 | 0.04 | 0.08 | 0.03 | 0.002 |

Abr. = abrasive; Cat. = iron nitrate nonahydrate; MA = malonic acid; Inhib. = N,N,N′,N′-pentamethyl-N-tallow-1,3-propanediammoinium dichloride
(Kathon = Kathon, LX from Dow Chem. Company (isothiazolinone biocide))

TABLE 12

Surfactant comparison

| Form ID | type | Base | Abr. (2%) | pH | Surf. | Surf. charge | Surf. (%) |
|---|---|---|---|---|---|---|---|
| 12a | Comp. | 11A | 2 | 3 | none | none | none |
| 12b | Comp. | 11A | 2 | 3 | PVA | neutral | 0.02 |
| 12c | Comp. | 11A | 2 | 3 | PVP | neutral | 0.02 |
| 12d | Comp. | 11A | 2 | 3 | PSS | anionic | 0.02 |
| 12e | Comp. | 11A | 2 | 3 | Pluronic F38 | neutral | 0.005 |
| 12f | Comp. | 11A | 2 | 3 | Tween 20 | neutral | 0.01 |
| 12g | Comp. | 11A | 2 | 3 | Celquat H100 | cationic | 0.02 |
| 12h | Inv. | 11A | 2 | 3 | TBAN | cationic | 0.03 |
| 12i | Comp. | 11B | 2 | 4 | none | none | none |
| 12j | Comp. | 11B | 2 | 4 | Tween 20 | neutral | 0.01 |
| 12k | Comp. | 11B | 2 | 4 | Jeffamine M-600 | cationic | 0.01 |
| 12l | Inv. | 11B | 2 | 4 | TBAN | cationic | 0.01 |

PVA, PVP, PSS = Poly(vinyl alcohol), Poly(vinylpyrrolidone), Poly(styrene sulfonate), respectively.

TABLE 13

Particle Stability

| Formula ID | type | Native Particle PS (μm) | PS full formulation (μm) |
|---|---|---|---|
| 12A | Comp. | 0.05 | 0.05 |
| 12B | Comp. | 0.05 | >1 |
| 12C | Comp. | 0.05 | >1 |
| 12D | Comp. | 0.05 | 0.8 |
| 12E | Comp. | 0.05 | >1 |
| 12F | Comp. | 0.05 | 0.08 |
| 12G | Comp. | 0.05 | >1 |
| 12H | Inv. | 0.05 | 0.05 |
| 12i | Comp. | 0.06 | 0.06 |
| 12j | Comp. | 0.06 | 0.07 |
| 12k | Comp. | 0.06 | 0.08 |
| 12l | Inv. | 0.06 | 0.06 |

It is evident that polishing compositions of the invention with selected cationic surfactants have advantages in terms of improved stability with significantly reduced particle size growth.

The formulations were prepared and evaluated after 1 hour. The native particle sizes are the particles measured as received, prior to formulation.

EXAMPLE 6

This example shows an advantage of polishing compositions of the invention with respect particle stability during polishing. Wafers (1.5 in diameter, TEOS or W) were polished with IC1010 pad cut to size, using a TA Instrument ARG2 Rheometer, using the conditions outlined in Table 14. Particle size determinations (Malvern Instruments) for each slurry were carried out pre- and post-polishing. The particle size growth was determined by taking the ratio of the post-polish to the pre-polish particle size. These PS growth values have been normalized with respect to a control slurry with no additive in Table 15.

TABLE 14

Rheometer Polishing Parameters
Rheometer Polishing Conditions

| DF (N) | PS (rad/s) | Temp. (C.) | time (min) |
|---|---|---|---|
| 3.9 | 92 | 45 | 12 |

TABLE 15

Formulations and Particle Stability

| Form. ID | type | Abr. | Conc. (%) | pH | Surf. | Surf. (mM) | Rel. PS Increase (%) |
|---|---|---|---|---|---|---|---|
| 15a | Comp. | Silica-B | 2 | 4 | None (control) | | 100 |
| 15b | Comp. | Silica-B | 2 | 4 | THEMAH | 0.77 | 98 |
| 15c | Comp. | Silica-B | 2 | 4 | TMAN | 0.77 | 71 |
| 15d | Inv. | Silica-B | 2 | 4 | TBAN | 0.77 | 48 |
| 15e | Inv. | Silica-B | 2 | 4 | TBPB | 0.77 | 45 |
| 15f | Inv. | Silica-B | 2 | 4 | TBPB | 0.77 | 45 |
| 15g | Inv. | Silica-B | 2 | 4 | TBOPB | 0.77 | 18 |
| 15h | Inv. | Silica-B | 2 | 4 | TBMPMS | 0.77 | 46 |
| 15i | Inv. | Silica-B | 2 | 4 | BTBAB | 0.77 | 47 |
| 15j | Inv. | Silica-B | 2 | 4 | TPAB | 0.77 | 38 |
| 15k | Inv. | Silica-B | 2 | 4 | HPPB | 0.77 | 28 |
| 15l | Inv. | Silica-B | 2 | 4 | HMB | 0.77 | 29 |

BTBAB = Benzyltributylammonium bromide

Clearly, the inventive polishing compositions show reduced particle size growth during polishing as compared to the comparative slurries.

The invention claimed is:

1. A chemical mechanical polishing composition useful for processing a tungsten-containing surface, the slurry comprising:
    a liquid carrier,
    silica abrasive particles dispersed in the liquid carrier, the particles having a permanent positive charge of at least 8 millivolts (mV) at a pH of from 1 to 6, and cationic surfactant of Formula 1:

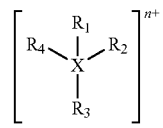

wherein
    n is at least 1;
    X is $P^+$ or $N^+$; and
    each of $R_1$, $R_2$, $R_3$, and $R_4$ can be independently selected from:
        hydrogen,
        a saturated or unsaturated cyclic group which may be substituted or unsubstituted and which may optionally include a charged group,
        a linear or branched alkyl group which may be saturated or optionally include unsaturation, and which may include a saturated or unsaturated cyclic group, any of which may be substituted or include a charged group, and
        a saturated or unsaturated ring structure formed from two or three of $R_1$, $R_2$, $R_3$, and $R_4$, the ring optionally being substituted, and
    wherein the value of n and the Log P of the cationic surfactant meet the formula:

$8(n-1)+\text{Log } P \geq 1$.

2. The composition of claim 1 wherein each of $R_1$, $R_2$, $R_3$, and $R_4$ is independently a linear alkyl group having from 1 to 12 carbon atoms.

3. The composition of claim 2 wherein the cationic surfactant includes one or a combination of: tetrabutylammonium, tetrapentylammonium, tetrabutylphosphonium, tributylmethylphosphonium, tributyloctylphosphonium.

4. The composition of claim 1 wherein each of $R_1$, $R_2$, and $R_3$ is independently a linear alkyl group each having from 1 to 12 carbon atoms, and $R_4$ is a group that includes a cyclic alkyl or aromatic ring optionally substituted and optionally containing a heteroatom.

5. The composition of claim 4 wherein the cationic surfactant is benzyltributylammonium bromide.

6. The composition of claim 1 wherein $R_1$ is a straight or branched alkyl group optionally substituted or unsaturated and having from 1 to 12 carbon atoms, and wherein $R_2$, $R_3$, and $R_4$ form an aromatic ring structure that may optionally be substituted by a group that contains a saturated or aromatic ring structure.

7. The composition of claim 6 wherein the cationic surfactant includes one or a combination of: 1-dodecylpyridinium, 1-dodecylpyridinium, 1-heptyl-4(4-pyridyl)pyridinium, 1-(4-pyridyl)pyridinium, methyl viologen.

8. The composition of claim 1 wherein $R_1$ is hydrogen; $R_2$ and $R_3$ are each independently an alkyl group each having from 1 to 12 carbon atoms; and $R_4$ is a heteroatom-containing alkyl having from 4 to about 15 carbon atoms.

9. The composition of claim 8 wherein the cationic surfactant is a salt of 1,1,4,7,10,10-hexamethyltriethylenetetramine.

10. The composition of claim 1 further comprising a nitrogen-containing inhibitor compound that is not a cationic surfactant according to Formula 1.

11. The composition of claim 10 wherein the nitrogen-containing inhibitor compound includes at least one nitrogen group and at least one carboxylic acid group.

12. The composition of claim 10 wherein the nitrogen-containing inhibitor compound contains at least two nitrogen groups.

13. The composition of claim 1 further comprising a metal-containing catalyst.

14. The composition of claim 1 comprising from about 0.5 to about 4 weight percent of the silica abrasive particles.

15. The composition of claim 1 wherein 30 percent or more of the silica abrasive particles include from 3 to 10 aggregated primary particles.

16. The composition of claim 1 wherein the silica abrasive particles comprise a cationic compound incorporated into the particles, and wherein the cationic compound is a charged nitrogen-containing compound or a charged phosphorous-containing compound, in the slurry.

17. The composition of claim 1 comprising from about 0.1 to about 5,000 parts per million of the cationic surfactant.

18. A method of chemical mechanical polishing a substrate that includes a surface comprising tungsten, the method comprising:
(a) contacting the substrate with a polishing composition comprising:
a liquid carrier,
silica abrasive particles dispersed in the liquid carrier, the particles having a permanent positive charge of at least 8 millivolts (mV) at a pH of from 1 to 6, and
cationic surfactant of Formula 1:

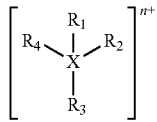

wherein
n is at least 1;
X is $P^+$ or $N^+$; and
each of $R_1$, $R_2$, $R_3$, and $R_4$ can be independently selected from:
hydrogen,
a saturated or unsaturated cyclic group which may be substituted or unsubstituted and which may optionally include a charged group,
a linear or branched alkyl group which may be saturated or optionally include unsaturation, and which may include a saturated or unsaturated cyclic group, any of which may be substituted or include a charged group, and
a saturated or unsaturated ring structure formed from two or three of $R_1$, $R_2$, $R_3$, and $R_4$, the ring optionally being substituted, and
wherein the value of n and the Log P of the cationic surfactant meet the formula:

$8(n-1)+\text{Log } P \geq 1$;

(b) moving the polishing composition relative to the substrate; and
(c) abrading the substrate to remove a portion of the tungsten from the substrate.

19. The method of claim 18 wherein the cationic surfactant includes one or a combination of: tetrabutylammonium, tetrapentylammonium, tetrabutylphosphonium, tributylmethylphosphonium, tributyloctylphosphonium.

20. The method of claim 18 wherein each of $R_1$, $R_2$, and $R_3$ is independently a linear alkyl group each having from 1 to 12 carbon atoms, and $R_4$ is a group that includes a cyclic alkyl or aromatic ring optionally substituted and optionally containing a heteroatom.

21. The method of claim 20 wherein the cationic surfactant is benzyltributylammonium bromide.

22. The method of claim 18 wherein $R_1$ is a straight or branched alkyl group optionally substituted or unsaturated and having from 1 to 12 carbon atoms, and wherein $R_2$, $R_3$, and $R_4$ form an aromatic ring structure that may optionally be substituted by a group that contains a saturated or aromatic ring structure.

23. The method of claim 18 wherein $R_1$ is hydrogen; $R_2$ and $R_3$ are each independently an alkyl group each having from 1 to 12 carbon atoms; and $R_4$ is a heteroatom-containing alkyl having from 4 to about 15 carbon atoms.

* * * * *